May 21, 1957  H. W. VAN DUSEN  2,793,032
SHEET COLLATING MACHINE
Filed Dec. 14, 1953  17 Sheets-Sheet 1
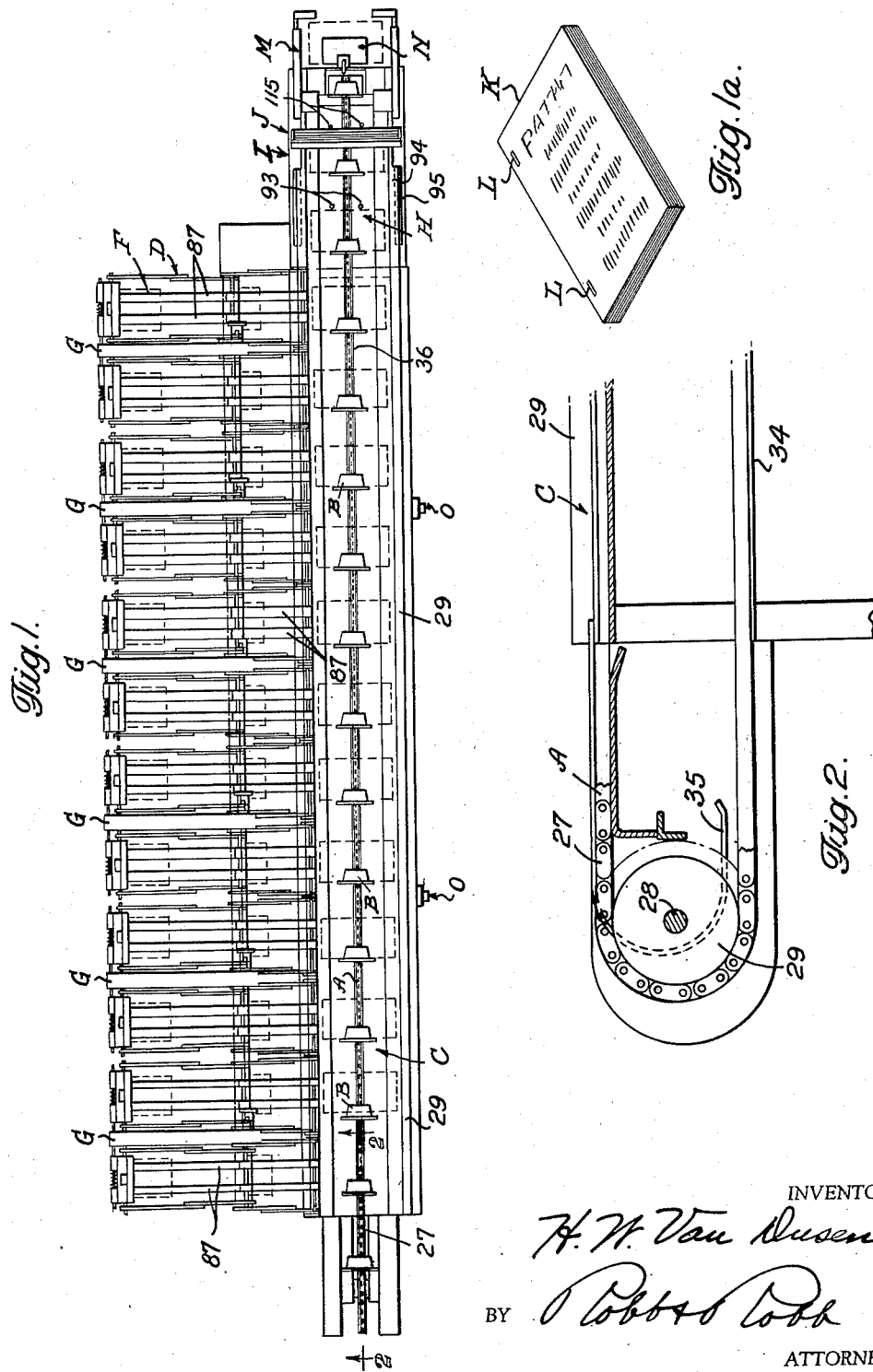
INVENTOR
H. W. Van Dusen
BY Cobb & Cobb
ATTORNEYS May 21, 1957    H. W. VAN DUSEN    2,793,032
SHEET COLLATING MACHINE
Filed Dec. 14, 1953    17 Sheets-Sheet 2

INVENTOR
H. W. Van Dusen
BY Robert Cobb
ATTORNEYS

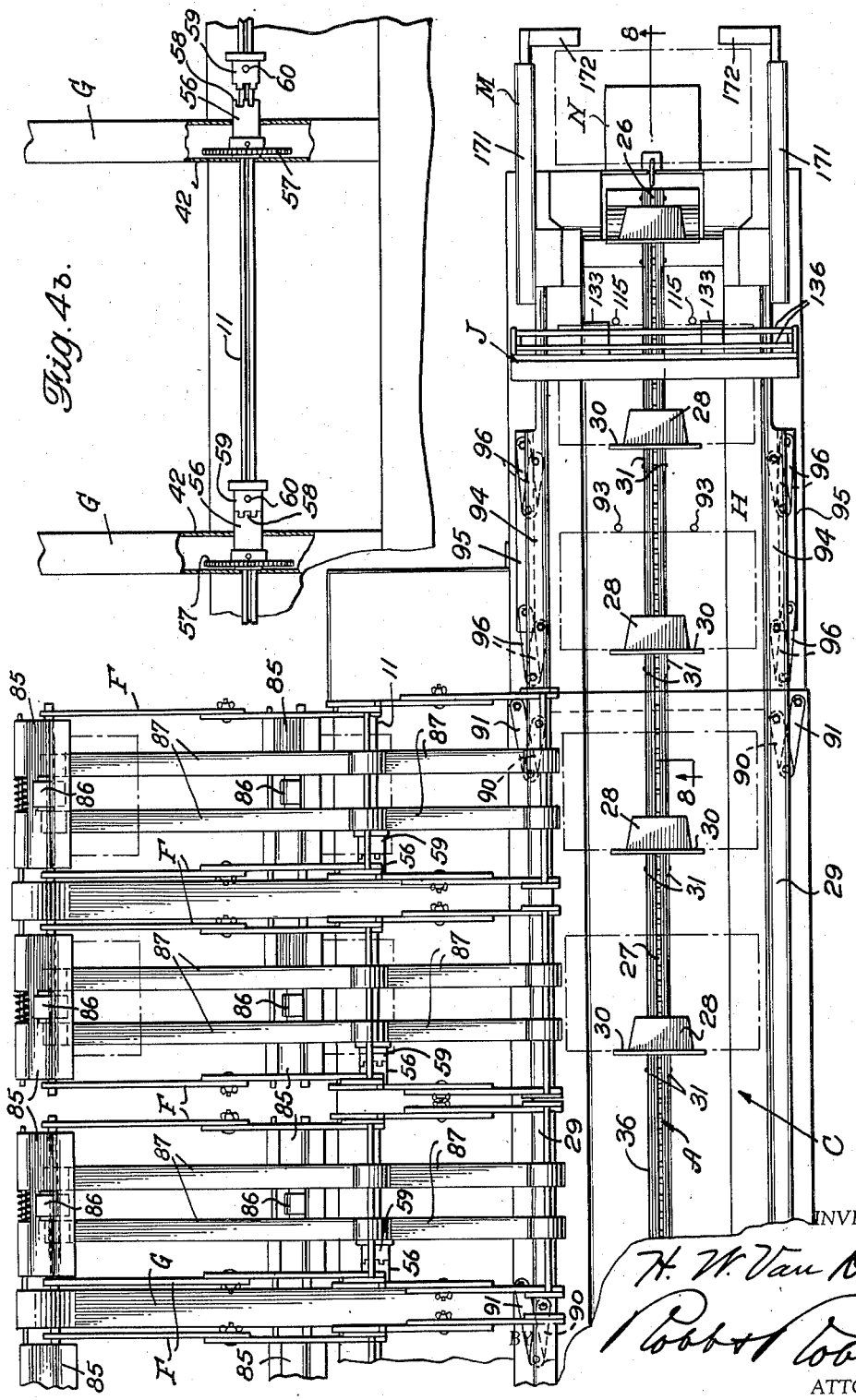

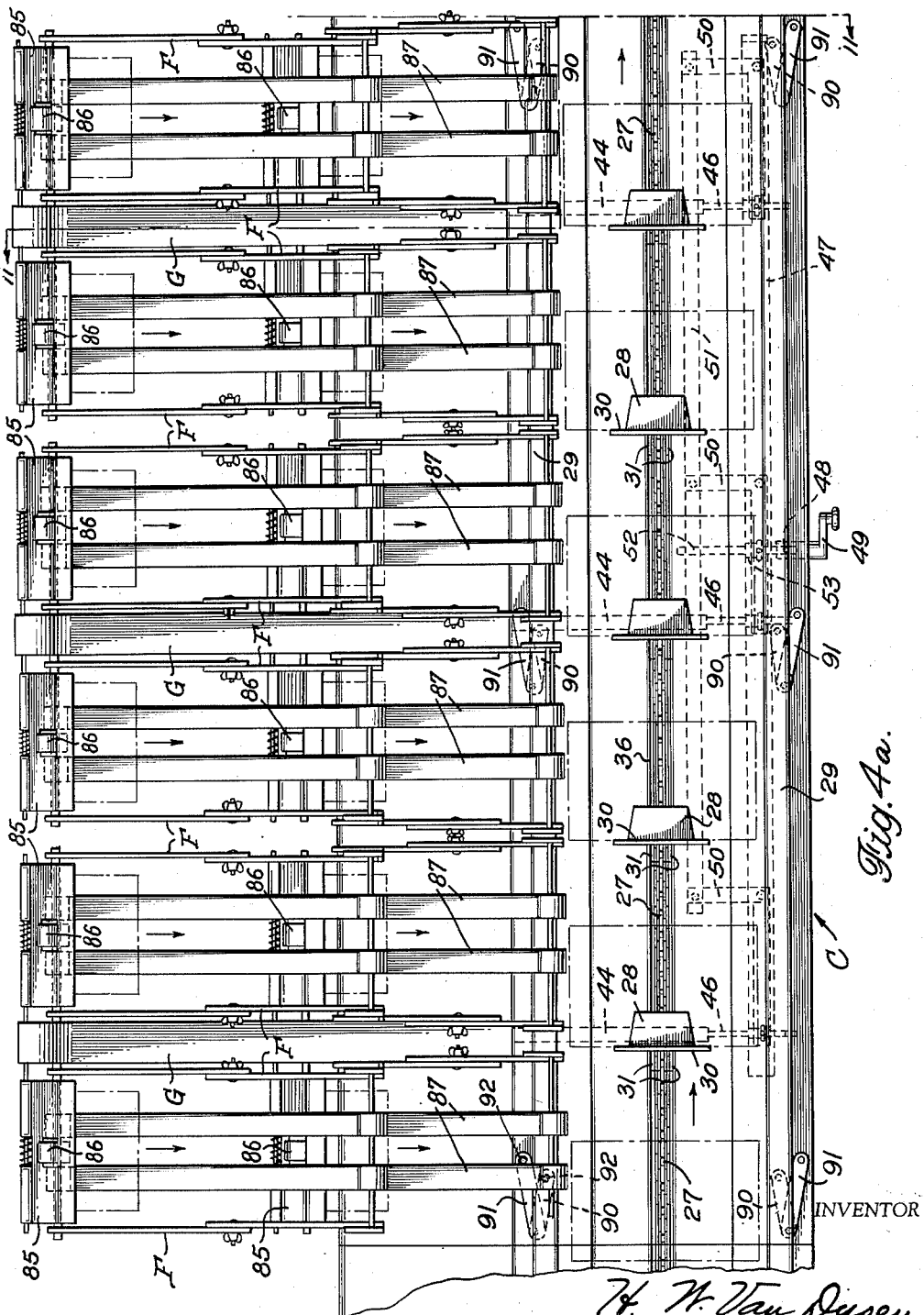

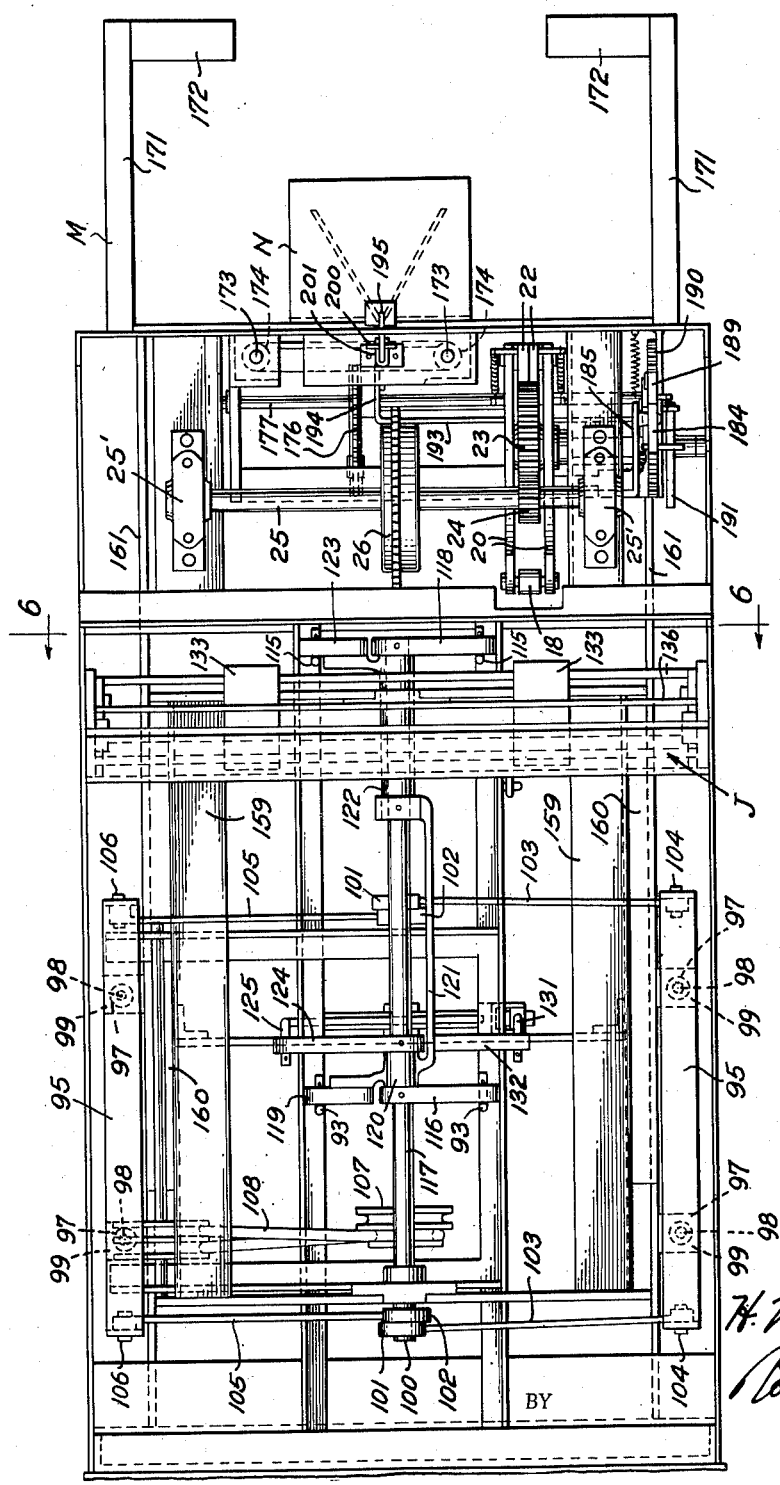

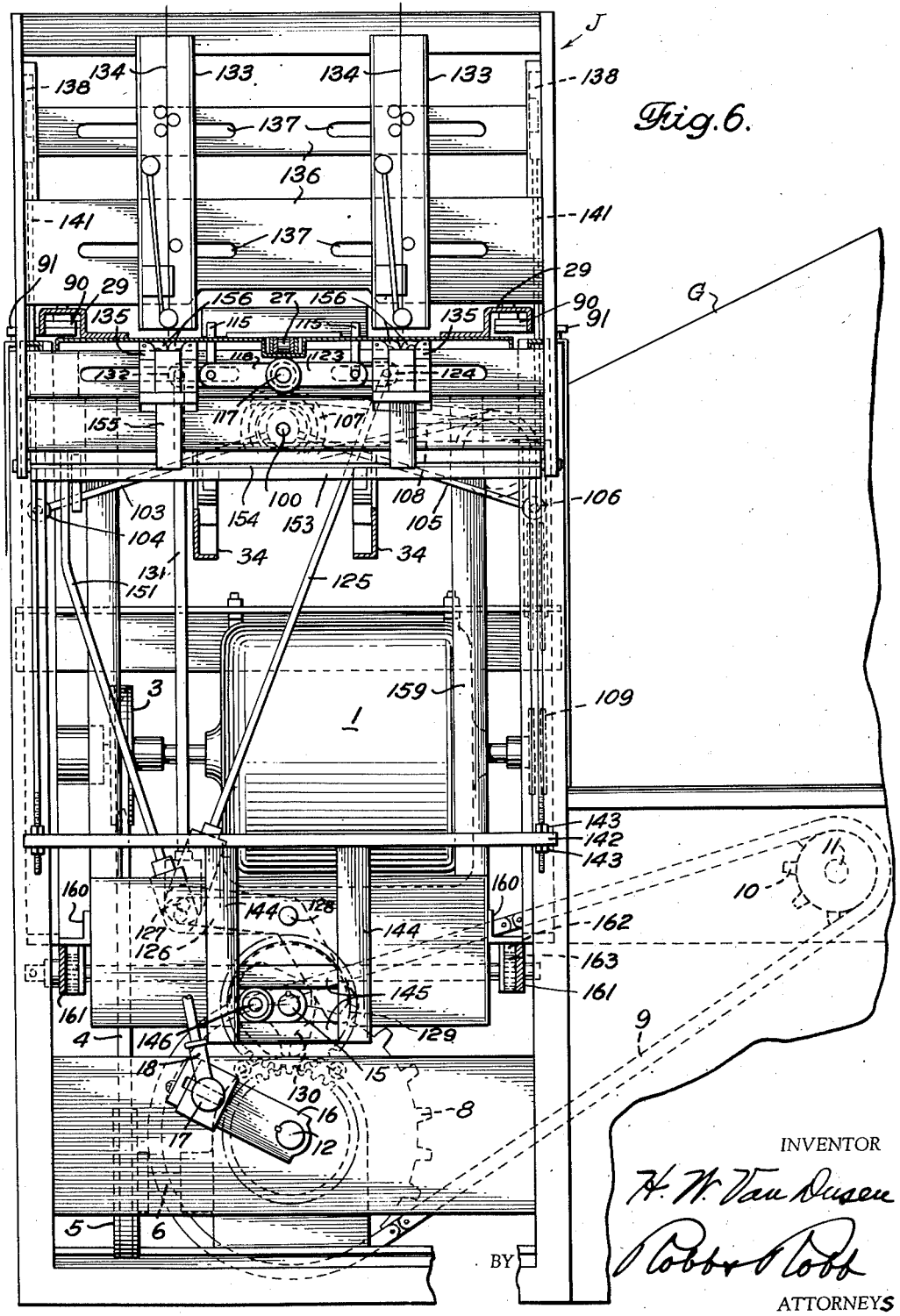

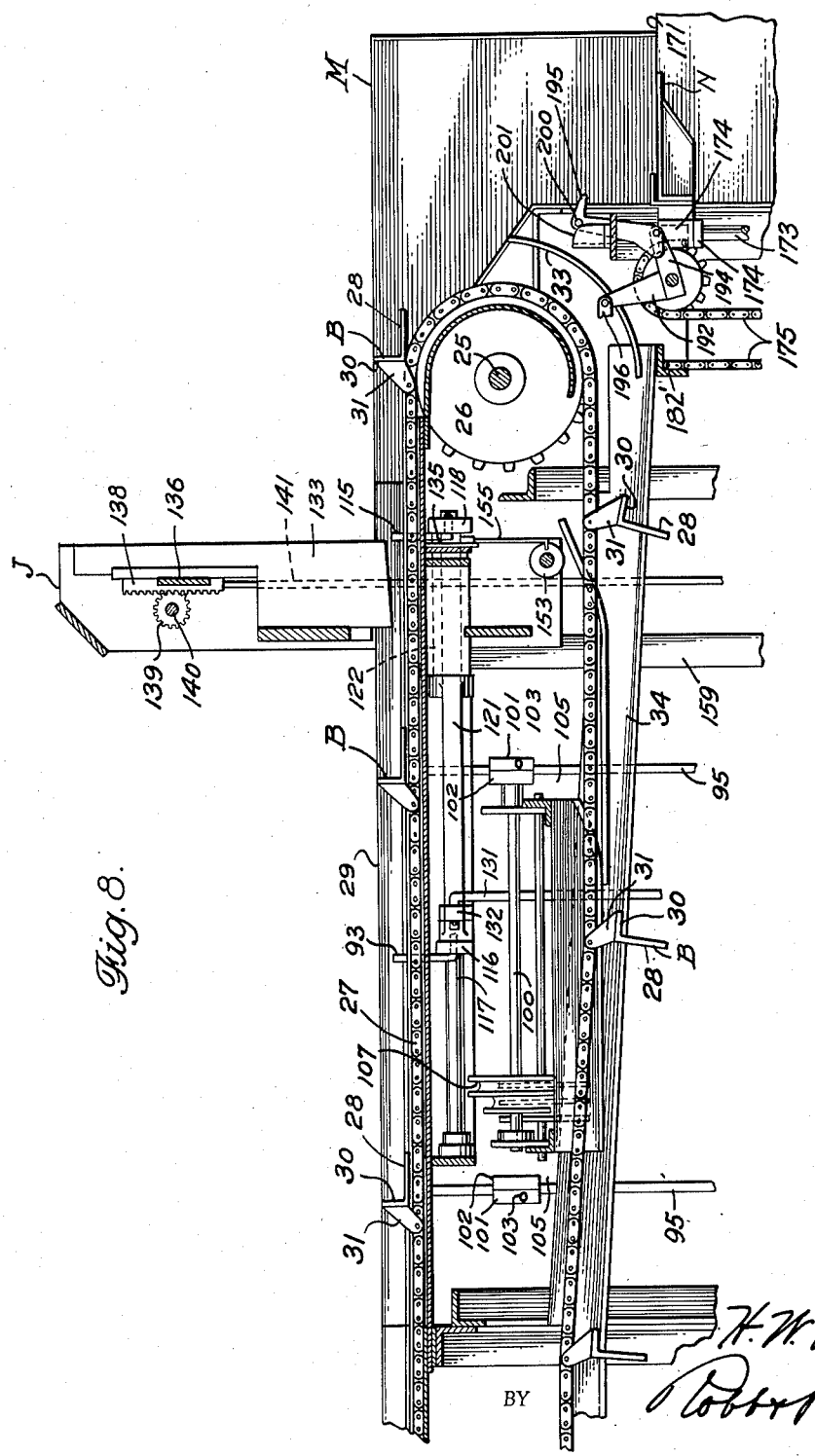

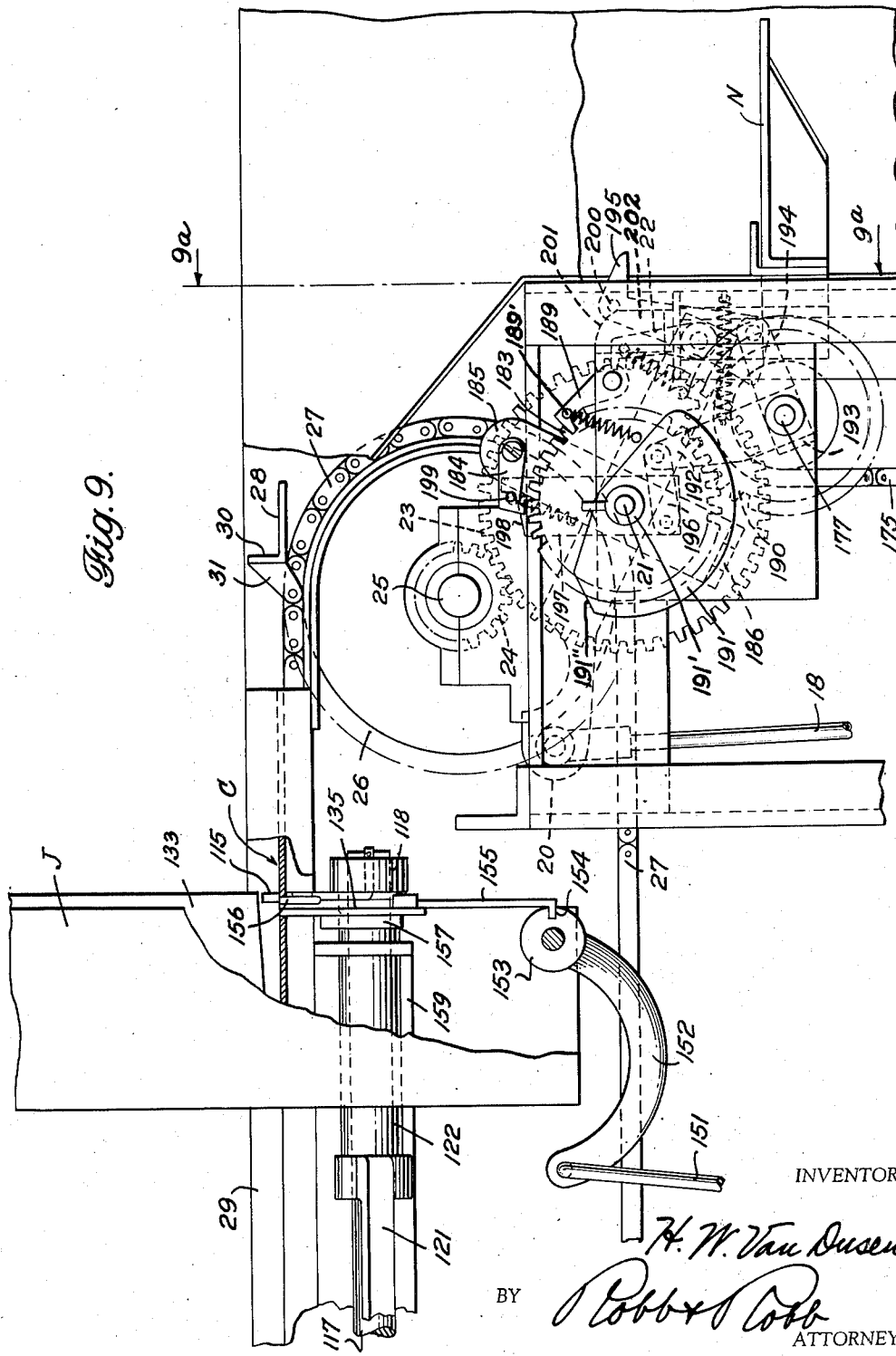

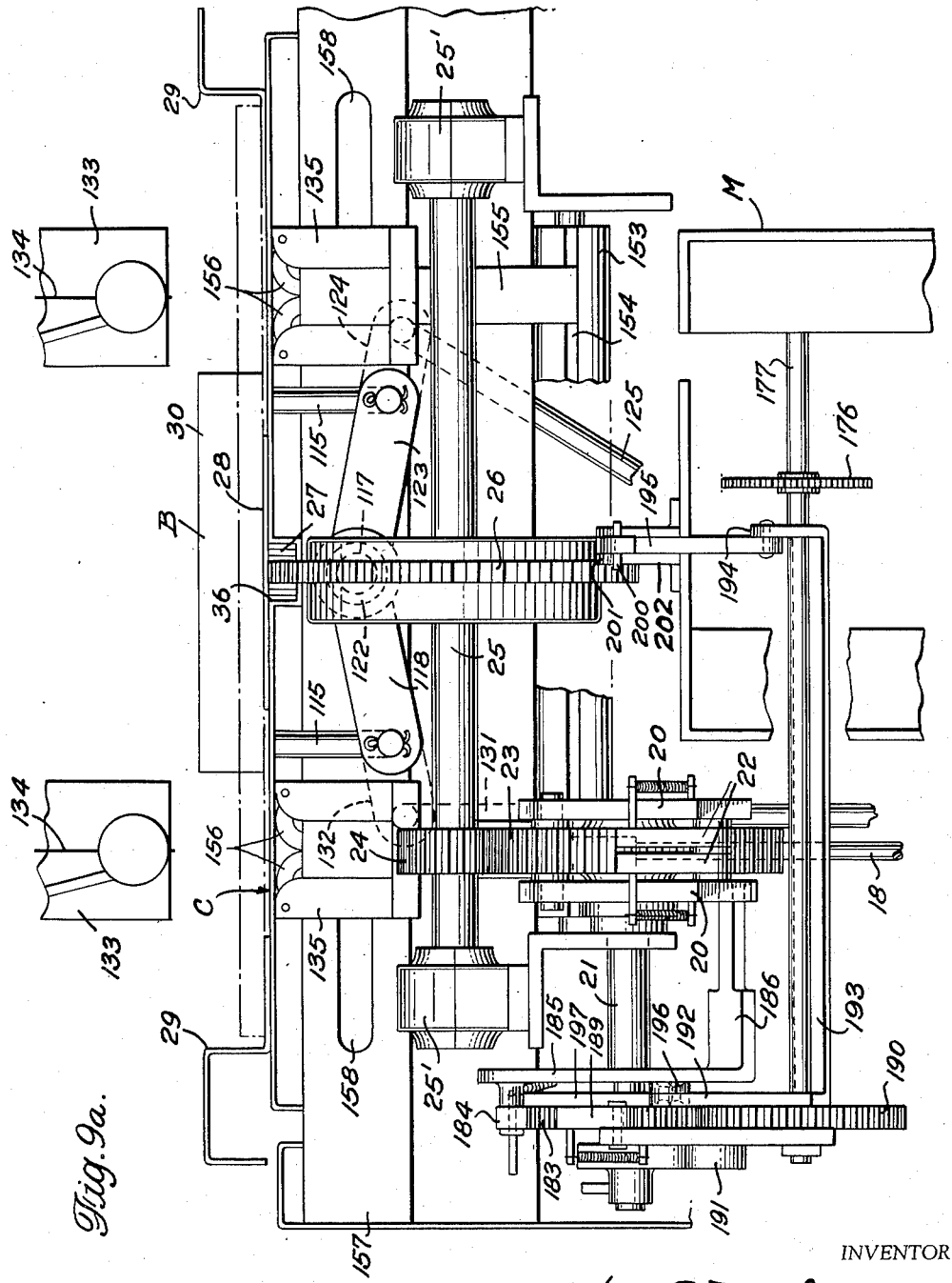

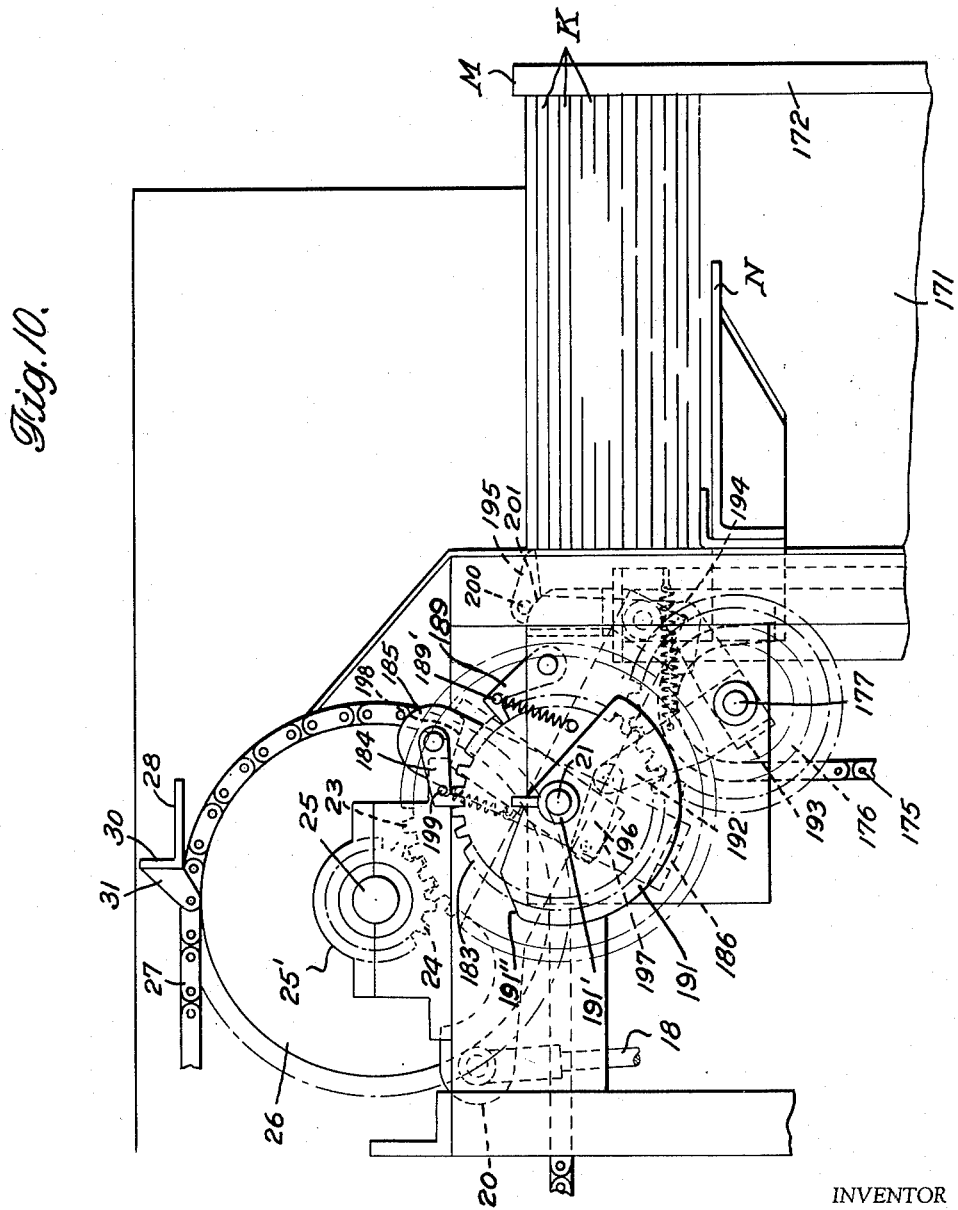

May 21, 1957 H. W. VAN DUSEN 2,793,032
SHEET COLLATING MACHINE
Filed Dec. 14, 1953 17 Sheets-Sheet 13

INVENTOR
H. W. Van Dusen
BY
Robb & Robb
ATTORNEYS.

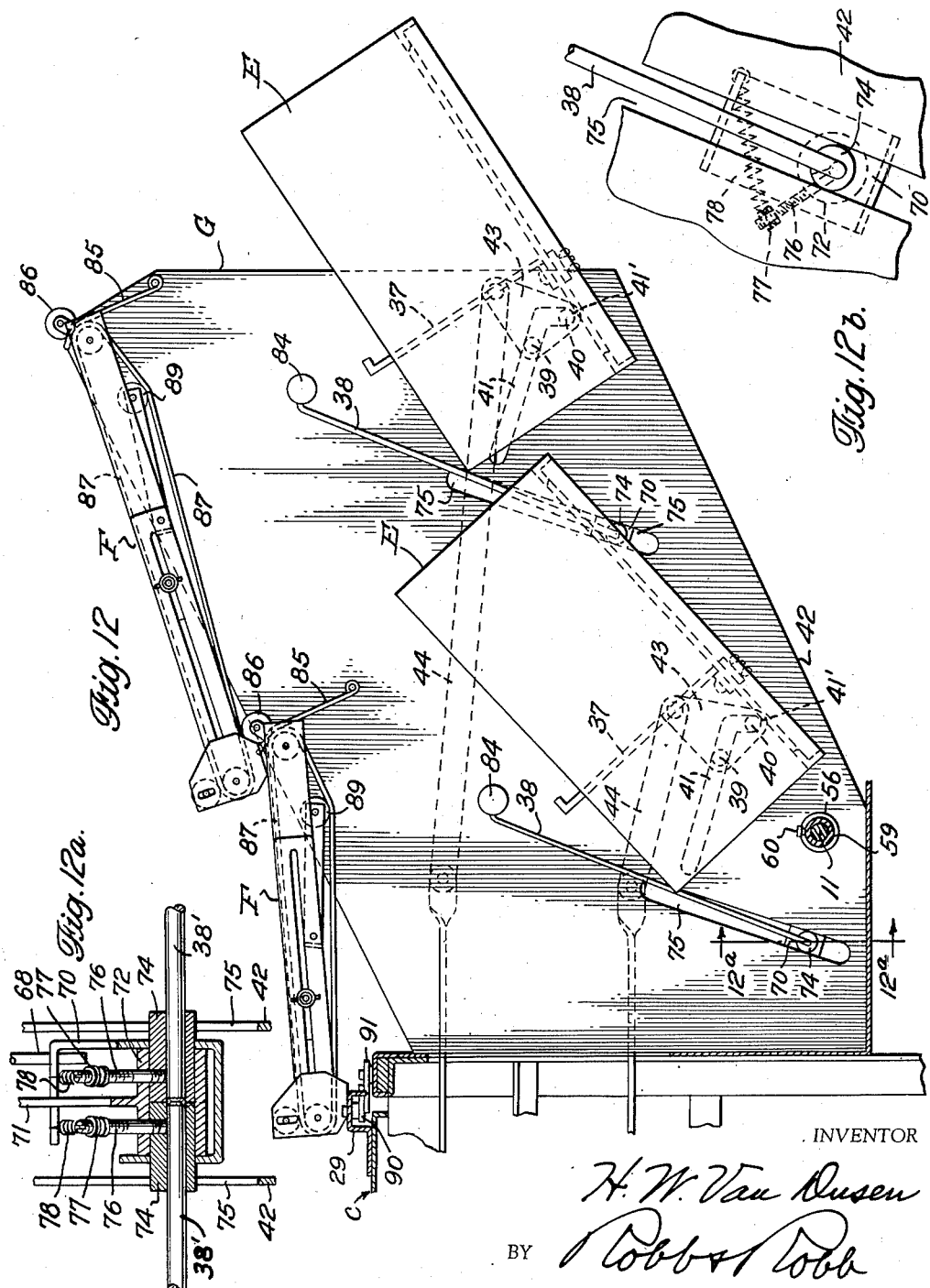

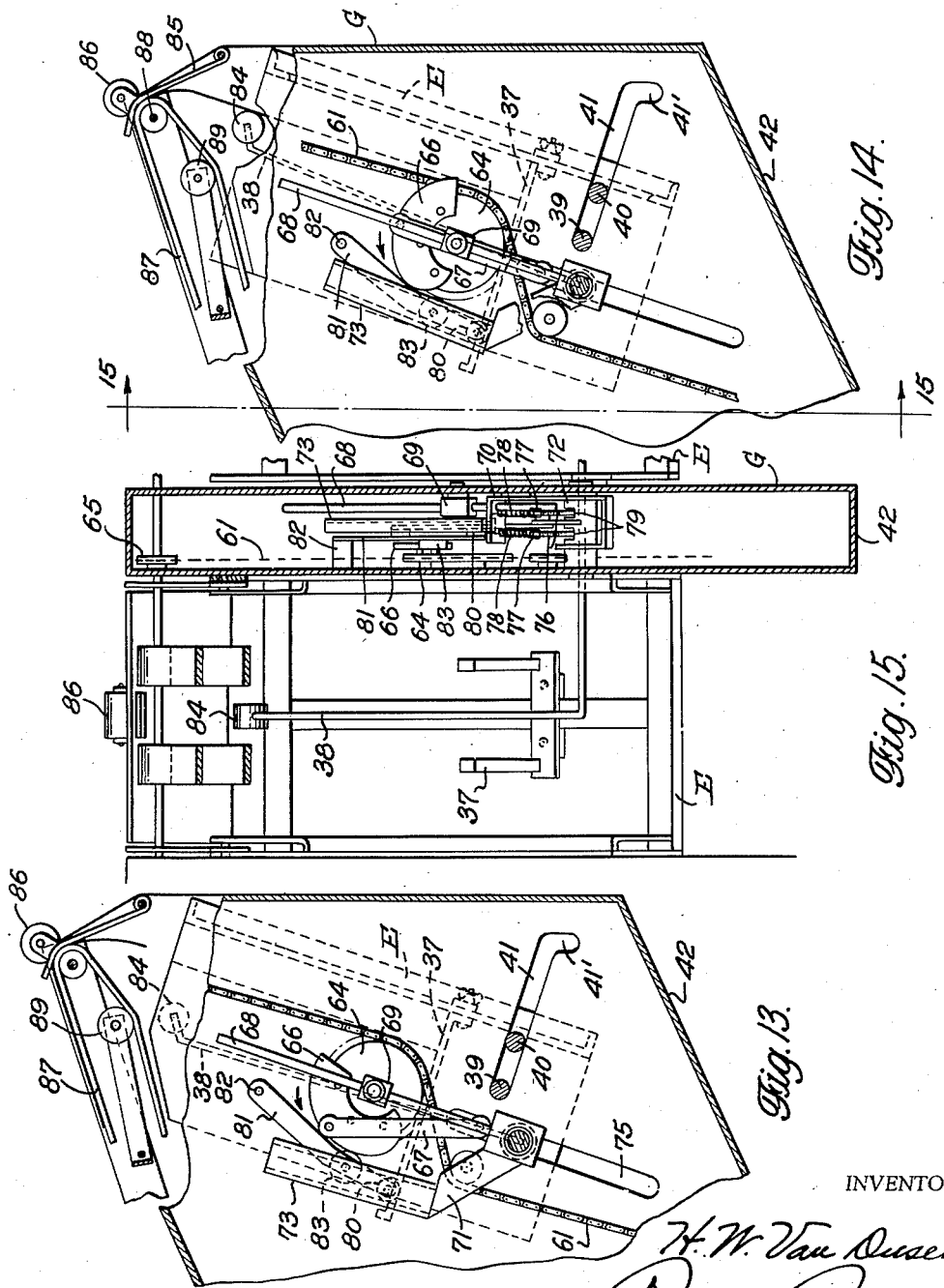

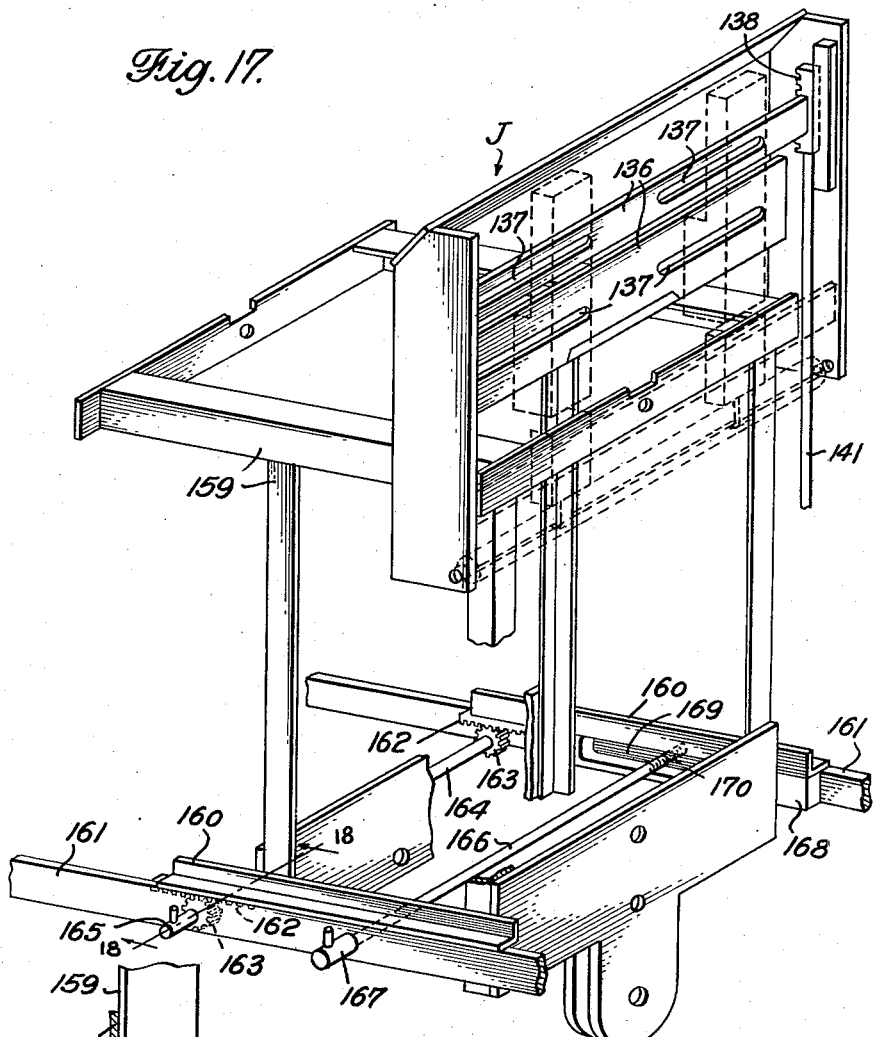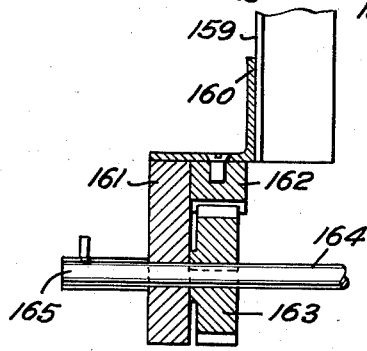

United States Patent Office 2,793,032
Patented May 21, 1957

2,793,032
SHEET COLLATING MACHINE
Harold W. Van Dusen, Newark, N. Y.
Application December 14, 1953, Serial No. 398,155
14 Claims. (Cl. 270—58)

The present invention relates to sheet collating machines, and more particularly, to a novel and improved machine for feeding and assemblying paper sheets in a sequentially correlated order, stitching or stapling the assembled sheets together to form successive booklets or pamphlets, and delivering and stacking the finished booklets or pamphlets in stacks of such predetermined size as to facilitate bundling and handling of the same.

One of the primary objects of the invention is to provide a sheet collating machine of the aforementioned type which is rapid, accurate and efficient in its operation, relatively inexpensive to service and maintain in good working order, and which requires a minimum of attention during operation.

Another object is to provide an improved sheet collating machine which is largely composed of standard and conventional working parts, and only relatively few special parts which are comparatively simple in form and easy to construct or fabricate.

A further object of the invention is to provide a collating machine as noted above, which is so constructed and designed as to permit inspection or observation of both sides of each sheet during the collating operations, and which may be instantaneously controlled by the operator or operators at all times to interrupt operation of the machine, and particularly when a defective or blank sheet is observed or detected during the assembly of a series of printed or mimeographed sheets, so that the defective or blank sheet may be discarded and replaced by a perfect sheet before resumption of operation of the machine to complete the booklet or pamphlet in which the defective or blank sheet would otherwise have been assembled.

More specifically speaking, my improved sheet collating machine generally comprises an intermittently driven endless main conveyor having a plurality of sheet supports or flights carried thereby at equidistantly spaced intervals, a plurality of sheet feeding or dispensing means disposed at spaced intervals along one side of said main conveyor, each dispenser having auxiliary conveyor means for successively feeding sheets from a supply magazine to the main conveyor in timed relation to the intermittent motion of the latter means, for jogging each group of collated sheets as they approach the delivery end of the main conveyor, stapling means for stapling or stitching the sheets before discharge from the delivery end of the main conveyor, and a stacking receiver at the delivery end of the main conveyor for receiving and stacking the stapled groups of sheets.

A still further object is to provide a collating machine which is adjustable to accommodate sheets of different size, and preferably sheets of different length and/or different width.

Yet another object of my invention is to provide adjusting means for adjusting the position of the dispenser magazines, said adjusting means preferably being operable to adjust each individual magazine independently of the others, as in individually regulating the sheet feeding operation thereof, and also being operable to simultaneously adjust all or predetermined groups of the magazines together to facilitate loading or unloading thereof.

Still another object of the invention is to provide means for adjusting the stitcher or stapling mechanism according to the length and/or width of the sheets being collated, and additionally, for adjusting said mechanism according to the number of sheets and the combined thickness of the completely collated group of sheets for which the machine is set to operate for any selected run.

It is also an object of the invention to provide an improved sheet collating machine having a series of sheet feeds or dispensers constructed or arranged in multiple groups or units, and having means for selectively driving or deenergizing any group or groups of feeds or dispensers, at will, according to the number of sheets to be collated in any given run.

Other and further objects and advantages of the invention will be hereinafter described, and the novel features thereof defined in the appended claims.

In the drawings:

Fig. 1 is a top plan view, partly diagrammatical, of a sheet collating machine constructed in accordance with my invention, and showing generally the main conveyor extended from end-to-end across the front of the machine, with a stacking receiver at the delivery end of said main conveyor and a series of double-tiered auxiliary sheet feeding conveyors disposed along the main conveyor at the back thereof;

Fig. 1a is a perspective view of a completely collated and staple-stitched group of sheets as discharged from the collating machine in the finished form of a booklet or pamphlet;

Fig. 2 is a fragmentary view in enlarged vertical section, as taken through the end of the main conveyor opposite to the discharge end, on the line 2—2 of Fig. 1;

Fig. 4 is an enlarged fragmentary view in top plan at the discharge end of the machine;

Fig. 4a is a top plan view similar to Fig. 4, showing an intermediate portion of the machine, including certain adjusting features thereof;

Fig. 4b is a fragmentary view, partly in top plan and partly in section, showing the common line shaft for driving the sheet feeding dispenser units, and the clutching means for selectively connecting or disconnecting the dispenser units to and from the line shaft;

Fig. 5 is an enlarged fragmentary view in top plan of the discharge end of the machine, with certain parts removed to expose the jogging mechanism, including the stop pins and parts of their actuating mechanism, as well as certain parts of the drive for the main conveyor and the stacker at the delivery end of the conveyor;

Fig. 6 is an enlarged vertical sectional view as taken on the line 6—6 of Fig. 5, and showing further details of the driving mechanisms, including the jogger drive and the stop pin actuating mechanism;

Fig. 8 is a fragmentary vertical sectional view taken on the central plane of the main conveyor, along the line 8—8 of Fig. 4;

Fig. 9 is a fragmentary view in elevation, showing portions of the actuating mechanisms of Fig. 7 on an enlarged scale;

Fig. 9a is a transverse sectional view as taken about on the line 9a—9a of Fig. 9;

Fig. 10 is a view generally similar to Fig. 9, but with the stacker partially loaded and with the operating means for the stacker platform tripped to cause downward movement to be imparted to the platform by its actuating mechanism;

Fig. 12 is a view generally similar to Fig. 11, with certain features of the latter omitted from Fig. 12, and with the sheet supply magazines tilted rearwardly to a position facilitating loading or unloading of the magazines;

Fig. 12a is a fragmentary sectional view as taken on the line 12a—12a of Fig. 12, showing specific details of the sheet pusher mountings and means for adjusting the same;

Fig. 12b is an enlarged fragmentary view in side elevation of the sheet pusher mounting assembly of Fig. 12a;

Fig. 13 is a fragmentary vertical sectional view of a portion of one of the sheet dispenser driving mechanisms, with the pusher raised out of contact with the sheets in its magazine and while the pusher is moving in a downward direction preparatory to feeding the next successive sheet from the magazine;

Fig. 14 is a view generally similar to Fig. 13, with the pusher engaged with a sheet and in the act of delivering the sheet to its feed conveyor, said pusher being shown at or near the upper limit of its upward stroke and just prior to being raised away from contact with the sheet and beginning its downward stroke as in Fig. 13;

Fig. 15 is a fragmentary sectional view as taken on the line 15—15 of Fig. 14;

Fig. 17 is a fragmentary perspective view showing the stitcher mounting frame and certain of the adjusting means for adjustably moving the stitcher assembly along the line of travel of the main conveyor; and Fig. 18 is a fragmentary view in section as taken on the line 18—18 of Fig. 17, through one of the rack and pinion assemblies for adjusting the position of the stitcher mounting frame.

Like reference characters designate corresponding parts in the various figures of the drawings.

General construction

Figure 3:
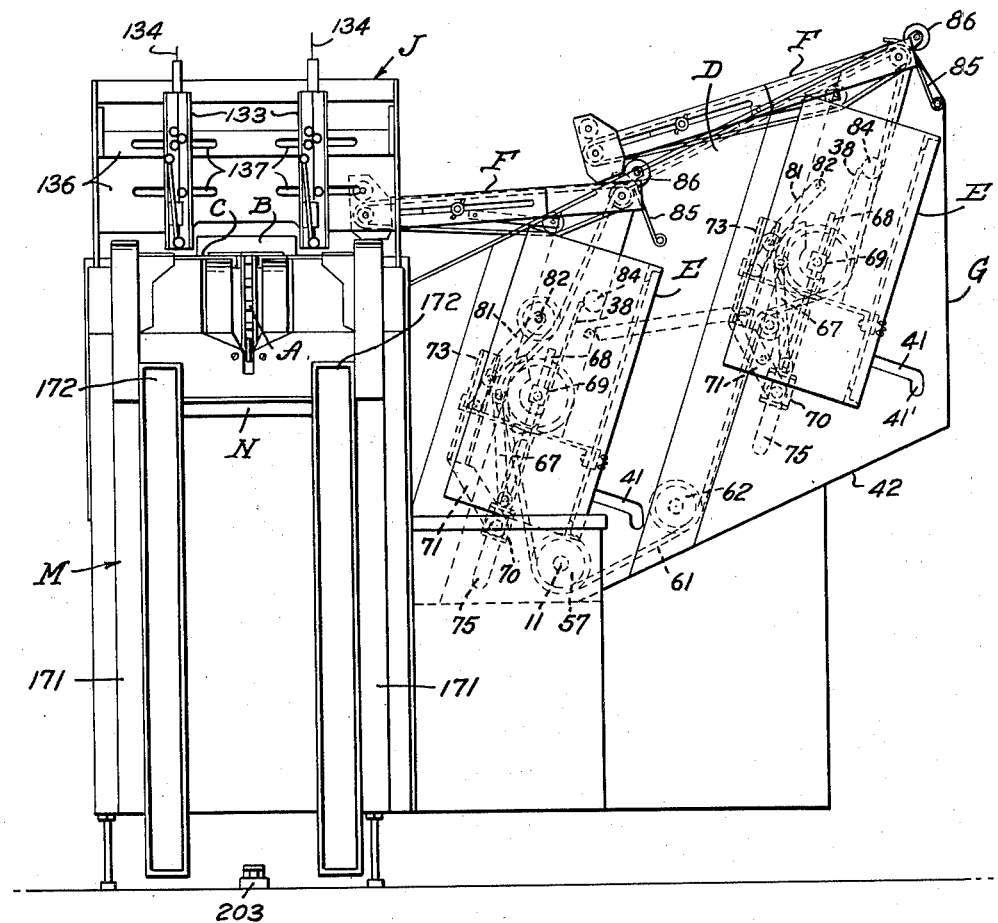
Fig. 3 is a view in end elevation at the discharge or delivery end of the machine.
Figure 16:
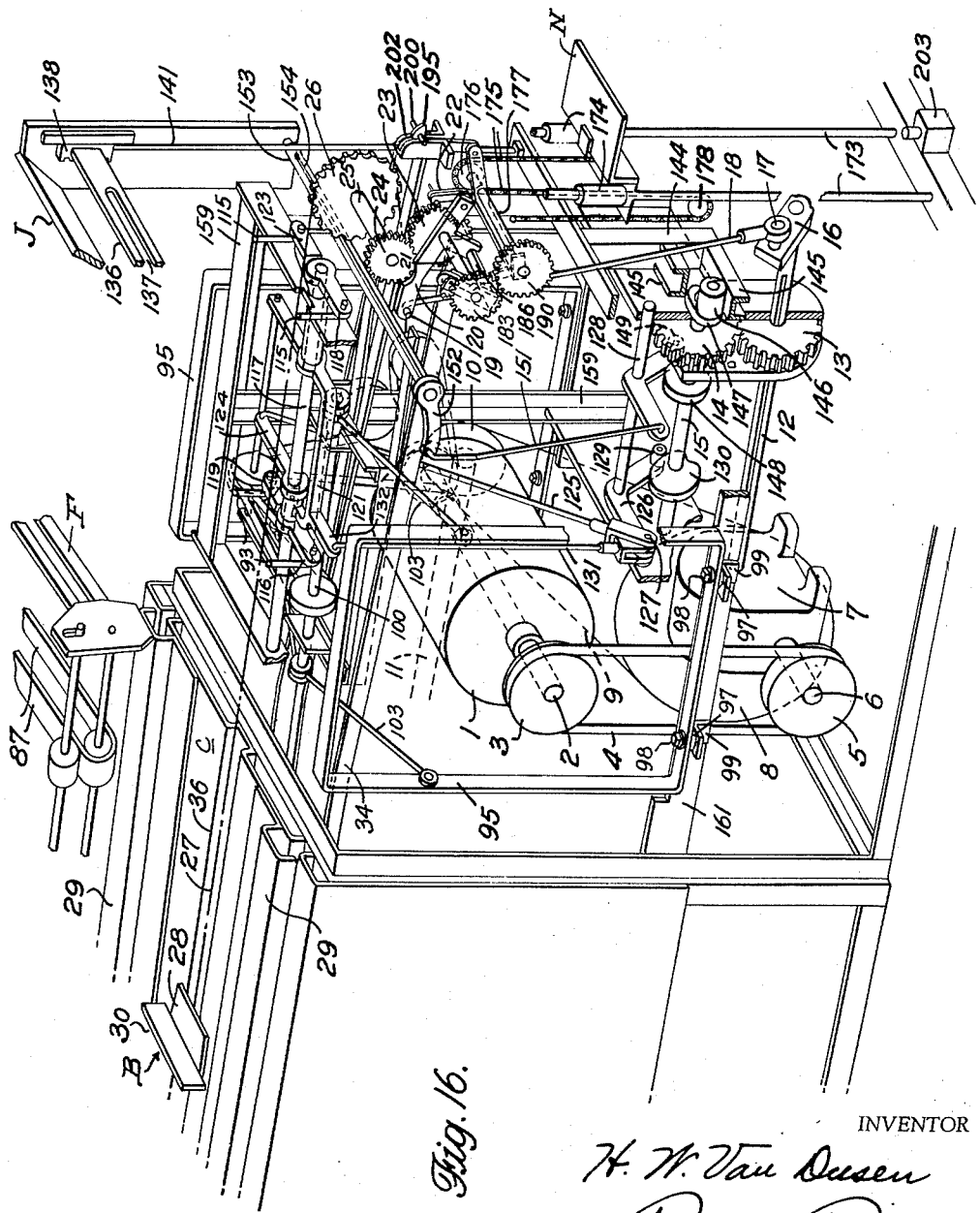
Fig. 16 is a fragmentary perspective view illustrating somewhat generally and diagrammatically the main drive features of the machine at the delivery end thereof.

The general construction of the preferred form of my invention may be understood from reference to Figs. 1 and 3, which are views in top plan and in end elevation, respectively, of a typical completely assembled machine, and to the diagrammatic perspective view of Fig. 16 which correlates the principal parts of the driving mechanisms and power transmission for driving the moving parts of the machine which are operated in timed relation to each other.

In the general assembly views, A represents an endless main conveyor which extends completely across the front side of the machine from end-to-end, said main conveyor including a plurality of sheet supports of flights as indicated at B, said supports being equidistantly spaced apart so as to move across the upper surface of a table designated C which extends along the front side of the machine. The main conveyor A is adapted to be intermittently driven in any suitable manner, as by means of an appropriate driving mechanism and power transmission such as will be hereinafter more fully described. In its operation, the main conveyor moves along the table C and successively stops momentarily at each of a plurality of sheet-receiving stations at which the sheets to be assembled are fed onto the conveyor.

At the back of the machine, behind the table C, is a plurality of sheet feeding or dispensing units which are generally indicated at D, each of said units including one or more sheet supply magazines designated E and one or more auxiliary conveyors designated F for directing and feeding the sheets from the supply magazines E onto the supports B of the main conveyor A.

According to the arrangement illustrated in the drawings, the sheet dispensing units and auxiliary conveyors are arranged in groups of four per group, and the respective supply magazines and auxiliary conveyors are preferably arranged in two tiers, with one magazine and one auxiliary conveyor located immediately adjacent to the main conveyor A at one level, and another supply magazine and auxiliary conveyor being located directly behind the former and at a slightly higher level, as best shown in Fig. 3. This double-tiered arrangement is duplicated at each sheet feeding station along the main conveyor A, and between each adjacent double-tiered bank of sheet dispensing supply magazines and auxiliary conveyors, there is preferably provided a common driving mechanism generally indicated at G. The latter driving mechanisms are each enclosed in a housing disposed between each adjacent pair of double-tiered sheet feeding dispensers and auxiliary conveyors, and the respective common driving mechanisms serve to drive the feeds in groups of four feeds per group, with the result that two sheets are fed and delivered to the main conveyor A at each feeding station. It is to be understood, however, that the number of feeds per station, as well as the total number of feeds along the main conveyor may be varied as desired in constructing and assemblying my collating machine, according to the desired size of the machine and according to the desired capacity of the machine.

As the sheets are successively fed from the magazines E onto the main conveyor A and successively assembled, step-by-step, as the conveyor intermittently advances past each feeding station, the assembled sheets arrive at a first jogging station which is indicated generally at H in Fig. 1. At this jogging station, the sheets on the respective supports or flights B are subjected to vibration imparted to the sheets in a direction transverse to the path of travel of the main conveyor A, said vibration being created by appropriate jogging mechanism hereinafter more fully described. Following the initial jogging action just referred to, which occurs at station H, the assembled sheets are successively advanced to another station generally designated I near the delivery end of the machine. At this latter station I, a second jogging action is imparted to the sheets, corresponding to the action which occurs at station H, and also at station I, the assembled sheets are successively wire-stitched or stapled by any suitable stitching or stapling mechanism as generally indicated at J.

Following stitching or stapling of the sheets, which produces finished or completely assembled booklets or pamphlets, as generally shown in Fig. 1a in which the booklet or pamphlet is designated K, and the staples are designated L, the booklets or pamphlets are successively advanced to the extreme end of the main conveyor and the table associated therewith from which the booklets are discharged or delivered from the main conveyor A to a stacking receiver generally designated M. The stacking receiver M includes a movable platform or support N which occupies a position near the top of the stacking receiver M when empty, but which progressively moves downwardly in response to suitable operating mechanism hereinafter more fully described, as the booklets or pamphlets are successively discharged or delivered at the delivery end of the machine and are deposited one-upon-another on the platform N, until the platform reaches the limit of its downward travel, which occurs when the stacking receiver is filled. Thereupon, operation of the collating machine is automatically interrupted or stopped by appropriate automatic control mechanism which will be later described, and the machine remains out of operation until the stacked booklets or pamphlets are removed from the receiver M for packaging or other handling in stacks of convenient size.

When the receiver M has been unloaded, the platform N can be released and restored to its elevated position, as will be later described, and operation of the machine can be resumed in response to the operation of one or more controls as generally indicated at O, located at spaced stations along the front of the machine so as to be readily accessible to the operator or operators of the machine. Each of said controls O preferably includes button-operated switch means for discontinuing operation of the machine at any time upon actuation thereof, as well as button-operated switch means for resuming operation of the machine.

Figure 7:
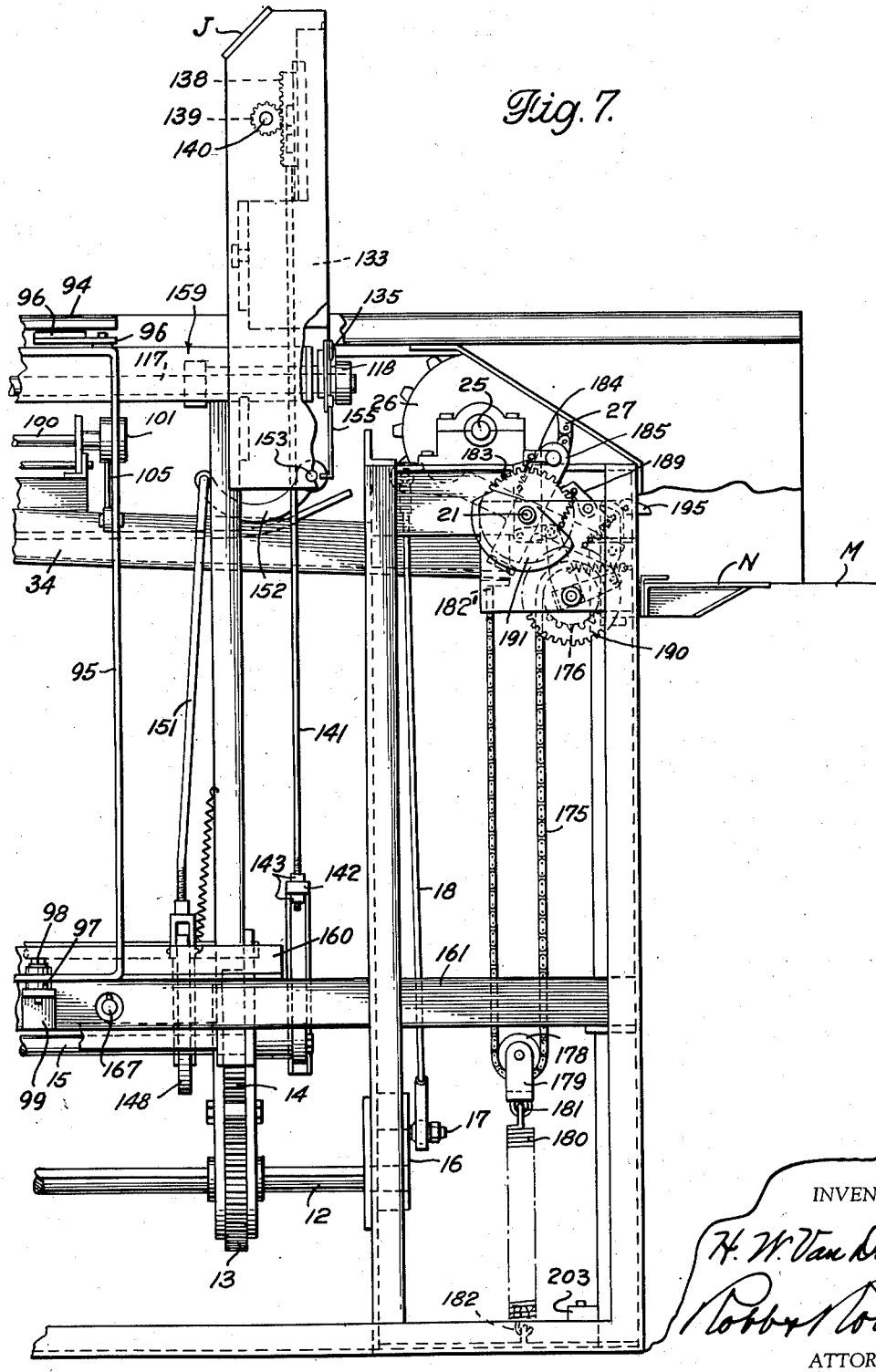
Fig. 7 is another fragmentary detail view in side elevation of the delivery end of the machine, showing further details of the driving mechanisms for the stitcher or stapler assembly, and also certain details of the main conveyor drive and the stacker operating mechanism.
Figure 7A:
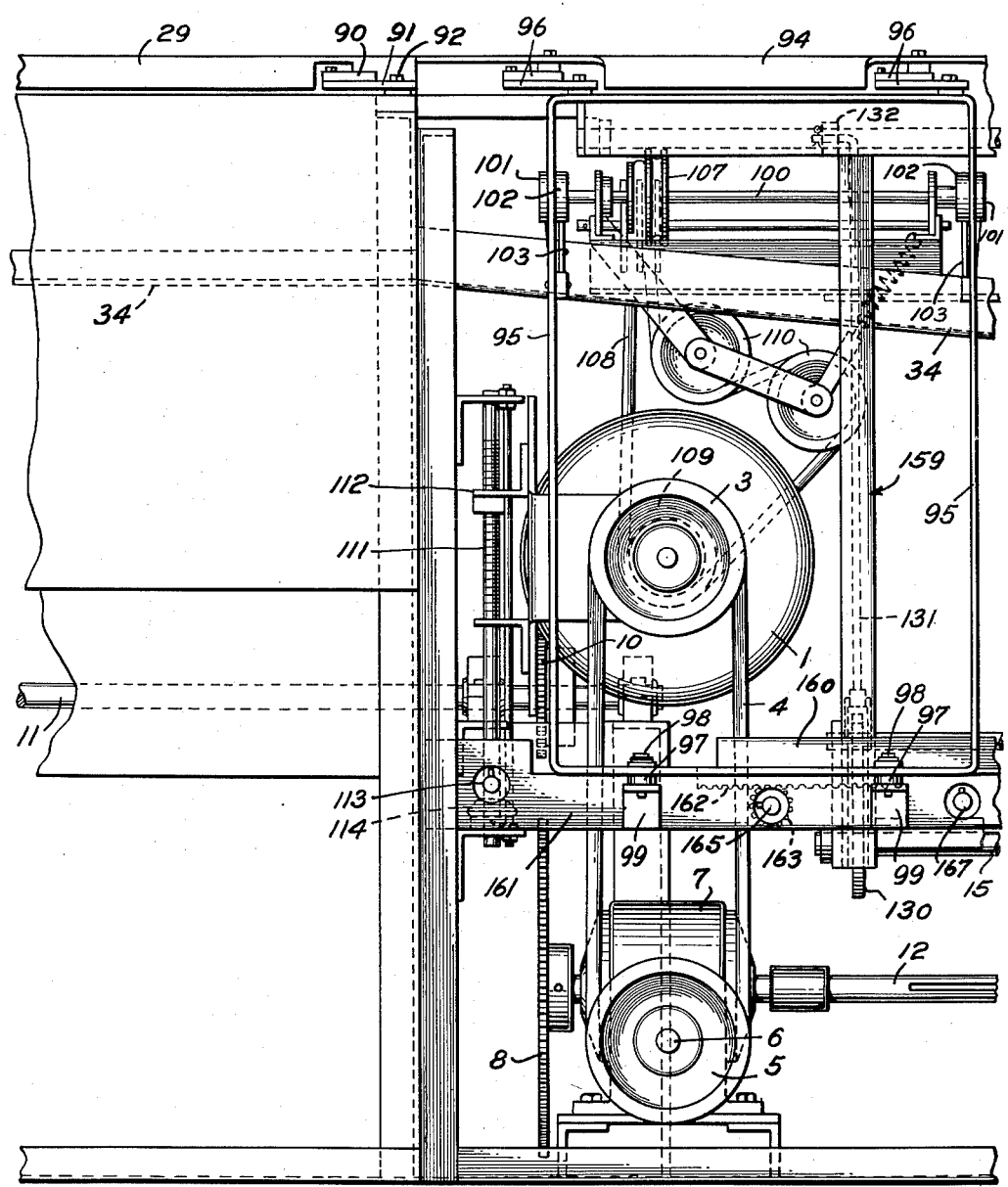
Fig. 7a is a view similar to Fig. 7 of a portion of the machine adjacent to that portion shown in Fig. 7, and more particularly showing additional details of the power transmission mechanism, the adjustable mounting for the driving motor, the jogger operating mechanism, etc.

As more particularly shown in Figs. 6, 7a and 16, the collating machine is operated by a suitable power transmission mechanism which drives the various operating parts of the machine in properly timed relation to each other. In the illustrative embodiment shown in the drawings, the driving mechanism includes an electric motor 1 having a shaft 2 extended from one end thereof on which is fixedly mounted an adjustable pulley 3, said pulley being connected by a belt 4 to a pulley 5 fixed on the input shaft 6 of a speed reducer unit generally designated 7. The details of the reducer unit are not material to the present invention, and therefore the same need not be further described.

The output of the speed reducer 7 is connected to and drives a sprocket 8 which drives a chain 9 which is connected with a sprocket 10 fixed to one end of a line shaft 11, said line shaft serving to deliver power to the driving mechanisms for the various sheet dispenser units generally designated D.

Extended from the speed reducer 7 at the side opposite to the sprocket 8 is an output shaft 12. Suitably keyed to the shaft 12 is a gear 13 which meshes with another gear 14 fixed to a rotatable cam shaft 15 which transmits power to certain of the operating mechanisms of the machine as will hereinafter be more fully described.

Fixed to the outer end of the output shaft 12 is a crank 16, said crank carrying an adjustable crank pin 17 to which one end of an operating link 18 is connected. The opposite end of the link 18 is pivotally connected at 19 to one end of a rocking beam 20, said beam being freely rockable on a shaft 21 extending through an intermediate portion of the beam. The opposite end of the rocking beam 20 is pivotally connected to a spring-biased pawl 22 which intermittently drives a ratchet wheel 23 which is rotatable on one end of the transverse shaft 21. The ratchet wheel 23 preferably has the form of a gear which meshes with another gear 24 fixed to one end of a transversed shaft 25 rotatably mounted in bearings 25' at the delivery end of the main sheet assemblying conveyor A. Suitably fixed on the shaft 25 is a sprocket 26 about which an endless conveyor chain 27 passes for intermittently driving the conveyor chain responsive to rotation of the crank 16 which operates the linkage and gear mechanism connecting the latter crank to the shaft 25.

At the opposite end of the machine, there is provided another transverse shaft 28 carrying a sprocket 29 about which the main conveyor chain 27 also passes, with the upper reach of the chain extending from end-to-end of the machine across the upper surface of the sheet assembly table C.

Main sheet gathering conveyor

Figure 3A:
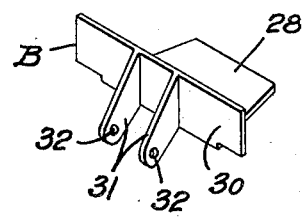
Fig. 3a is a perspective detail view of one of the flights or sheet supports carried by the main conveyor.

Suitably attached to the chain 27 at equidistantly spaced intervals therealong is a plurality of sheet supports or flights generally designated B. The specific form of these supports or flights B is best seen in Fig. 3a, from which it will be observed that each support includes a horizontally extended platform or tray 28 which is freely slidable along the upper surface of the assembly table C between and in spaced relation to guide rails 29, said guide rails being extended along the front and back edges of the assembly table C. At the back edge of each sheet support or platform 28, the platform is provided with an upstanding vertical wall 30 which catches and bears against the sheets as they are fed onto the respective supports 28 at each feeding station along the assembly table. The walls 30 serve to generally align the abutting edges of the sheets and prevent the sheets from becoming displaced from the supports 28 as the supports intermittently move along the assembly table from station-to-station. Extended from the outer face of the upstanding wall 30 of each sheet support B is a pair of transversely spaced ears or brackets 31, each bracket having an aperture 32 therein for receiving a pin or screw by means of which the respective sheet supports are pivotally attached to the conveyor chain 27.

As the supports or flights B pass about the sprocket 26 at the delivery end of the machine, and after discharging the assembled sheets into the stacking receiver M, the supports will be freely suspended from the lower reach of the conveyor chain 27, with the platforms or trays assuming a generally vertical position as more particularly shown in Fig. 8. During the return of the sheet supports or flights beneath the assembly table C to the opposite end of the machine, the respective opposite ends of the walls 30 are successively engaged by various guide rails respectively designated 33, 34 and 35, beneath the assembly table so as to prevent undue sagging of the conveyor chain, and to insure restoration of the sheet supports or flights as they pass about the sprocket 29 onto the upper surface of the assembly table at the latter end of the machine. As will be clearly seen in Figs. 1, 4 and 4a, the upper surface of the assembly table C is channeled or grooved at 36 along the center thereof from end-to-end, to recess the conveyor chain 27, and to allow movement of the connecting ears or brackets 31 along the table with the platforms or trays 28 sliding along the upper surface of table.

Sheet dispensers

Referring now to the sheet dispensers generally designated D, which are arranged along the rear side of the machine in side-by-side relation to each other, it will be seen from reference to Figures 3 and 11 to 14 inclusive that each dispenser unit includes two sheet supply magazines generally designated E which are positioned in two tiers, with one magazine slightly elevated above the other, at each feeding station along the sheet assembly table C. The magazines are preferably adjustable in width and are also preferably provided with vertically adjustable sheet supports 37 to accommodate sheets of different size, according to the size of the sheets that are to be collated in any given run. The sheets are loaded in the respective magazines E in a flat, stacked condition and are successively fed or dispensed from each stack by any appropriate feeding means such as a reciprocable pusher arm 38.

Figure 11:
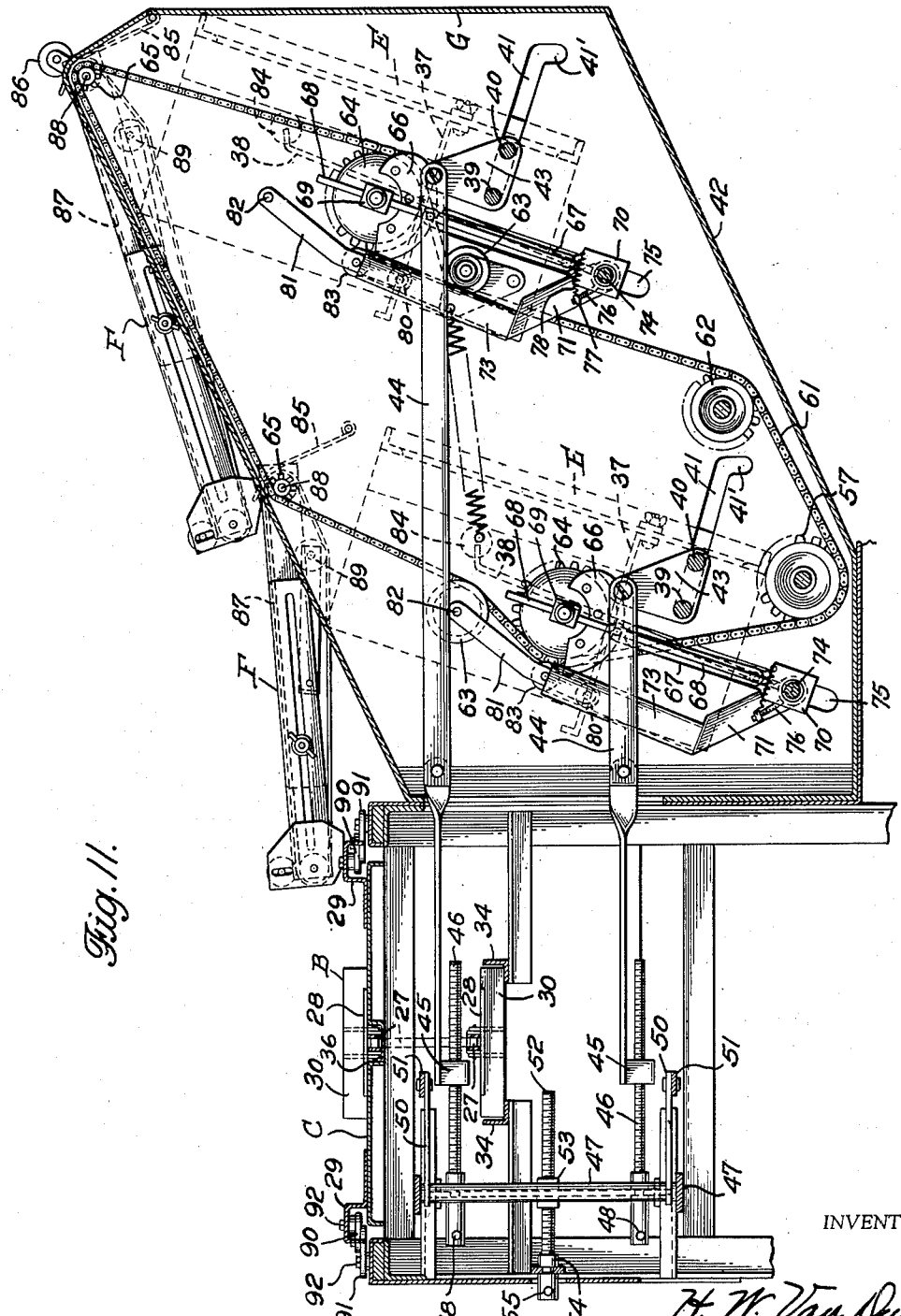
Fig. 11 is a transverse sectional view taken about on the line 11—11 of Fig. 4a, and more particularly showing the driving mechanism for one group of the paper dispensers and their transverse auxiliary conveyors, as well as the means for adjusting the position of certain of the sheet supply magazines from which the sheets are dispensed.

Each magazine E is preferably pivotally adjustable from a normal, generally upright position as indicated in Figures 3 and 11 respectively, to any desired rearwardly tilted position, said adjustment permitting general regulation of the pressure of the pusher arms 38 against the sheets which are being fed from the magazine, and also facilitating loading and unloading of the magazines when they are tilted to the extreme limit of their rearward tilting adjustment such as is illustrated in Fig. 12.

In order to permit such tilting adjustments of the magazines, the frame of each magazine is preferably provided, with a pair of laterally projecting pins 39 and 40 which are rigidly secured to the opposite sides of the magazine frame and extend through an elongated slot 41 in the adjacent side walls of the housings 42 which enclose and house the driving mechanisms which drive the sheet dispensers. As shown in the drawings, the rear end of each slot 41 is extended downwardly in a generally vertical direction, as indicated at 41', so that the pin 40 is permitted to drop downwardly in the slot 41' when the two pins 39 and 40 are shifted towards the rear end of the slot 41, thereby allowing the magazine E to assume a rearwardly inclined position as shown in Fig. 12. Since the slot 41 is extended rearwardly in a slightly downwardly inclined direction, shifting of the pins 39 and 40 to any suitable intermediate position along the slot 41 will cause the magazine to assume any desired intermediate tilted position, as will be obvious.

Rigidly mounted on the outer ends of the pins 39 and 40 is a generally triangular plate 43, and pivotally connected to the upper corner of the plate is a link 44 which is extended forwardly towards the front of the machine beneath the assembly table C. At the forward end of the link 44, the link carries an internally threaded nut 45 which is threadedly engaged by a screw 46 which is rotatably mounted in a frame 47, but secured against axial movement relative to said frame 47. The extreme forward end of the screw 46 is provided with a transversely extended pin 48 or any other appropriate form of head, for engagement with an operating crank, as designated 49 in Fig. 4a. Thus, when the crank 49 is engaged with the forward end of the screw 46, rotation may be imparted to the screw in either direction, thereby causing forward or rearward tilting of the sheet magazine E, as may be desired at any time.

The same adjusting mechanism as has been described above is substantially duplicated for each sheet supply magazine, except that the adjusting link for the rearmost magazine of each double tiered group is longer than the corresponding link for the foremost magazine, and the adjusting screw for the rearmost magazine is mounted in the frame 47 near the upper end of the frame and above the adjusting screw for the corresponding foremost magazine of the same group.

The adjusting mechanism previously described is duplicated for the respective sheet dispensing magazines at each feeding station along the assembly table C, and the adjusting screws are accessible from the front of the assembly table, so that each magazine can be independently adjusted without affecting the position of any other magazine, when desired. However, additional adjusting means is also preferably provided for permitting simultaneous adjustment of all of the sheet magazines, or any group thereof if the total number of magazines exceeds the practical limit for simultaneous adjustment. In an arrangement such as has been shown in the drawings for illustrative purposes, a group adjustment is preferably provided so that half of the magazines may be simultaneously adjusted in one group, and the other half may be simultaneously adjusted in the other group. Accordingly, the screw frames 47 of each group are suitably connected to pivotally mounted crank levers 50, and one arm of each lever 50 is pivotally connected to a common longitudinally extended link 51. At about the center of the group of dispensers, that are to be adjusted simultaneously, there is provided another adjusting screw 52 which threadedly engages a nut 53 which in turn is suitably connected to one arm of the adjacent crank levers 50. The screw 52 is held against axial movement in any suitable manner, as by a collar 54 located on the screw at the inner side of the frame of the machine through which the screw extends, and the screw is provided with a forwardly projecting head at the front side of the frame, which head is provided with a transverse pin 55, corresponding to the pins 48 on the screws 46, so as to permit operation of the screw 52 by means of the crank 49. By rotating the screw 52 in one direction or the other, the entire group of dispensers magazines may be simultaneously adjusted in a forwardly or rearwardly tilted direction.

All of the sheet dispensers are driven by the common line shaft designated 11 which is powered by the motor 1. This line shaft is extended across the back portion of the machine and passes through each of the housings 42 which encloses the driving mechanism that operates the double-tiered dispenser units and auxiliary feeding conveyors that are immediately adjacent to each housing 42 on opposite sides thereof. At intervals along the line shaft 11, the shaft is provided with a series of sleeves 56, with the respective sleeves extending into the respective housings 42 and the sleeves being freely rotatable on the shaft 11. Fixedly mounted on one end of each sleeve is a sprocket 57, said sprockets being disposed within the respective housings 42, and the opposite end of each sleeve 56 has the form of one-half of a jaw-type coupling, as indicated at 58. Also mounted on the common line shaft 11 adjacent to each coupling 58 is a mating coupling 59 which may be shifted into and out of engagement with the coupling 58, said mating coupling 59 being suitably splined or otherwise keyed to the line shaft 11 so as to constantly rotate with the line shaft. Accordingly, when the coupling 59 is engaged with the coupling 58, power will be transmitted from the line shaft 11 to the sprocket 57, but when the coupling 59 is disengaged from the coupling 58, operation of the sprocket 57 will be discontinued, and the sprocket 57 will remain stationary. A set screw 60 or other appropriate securing means may be employed to hold the coupling 59 in either an engaged or disengaged position relative to the coupling 58. Upon disengagement of the coupling, any group of four dispenser units that are normally driven by the common drive sprocket 57 may be taken out of operation, and these dispenser units will remain idle at the two corresponding feeding stations along the main assembly table C.

Engaged with each drive sprocket 57 is an endless driving chain 61, said chain 61 also being engaged with an idler sprocket 62 from which the chain passes over a spring-biased chain tightener 63, to a cam sprocket 64 associated with the rearmost sheet dispenser unit as best shown in Fig. 11. From the cam sprocket 64, the chain continues about the upper auxiliary conveyor driving sprocket 65, then about a corresponding lower auxiliary conveyor driving sprocket also designated 65, from which the chain then passes under another idler 63 to another cam sprocket 64 associated with the forwardly located dispenser unit, and then back to the main drive sprocket 57.

As seen in Fig. 11, the drive chain 61, and the various sprockets about which the chain passes, operate in a counterclockwise direction. Each cam sprocket has fixed thereto a cam segment 66, and is also pivotally connected to one end of a connecting rod or link 67 (see Fig. 13). The lower end of each connecting rod 67 is pivotally connected to a push rod 68, the upper end of which push rod is slidably supported in a guide bearing 69 through which the push rod 68 freely slides in a generally upward and downward direction. Rigidly attached to the bottom of the push rod 68 is a crosshead 70 (see Figs. 12a and 15). Supported in the crosshead 70 and movable therewith, along with the push rod 68, is an arm 71 which carries a sleeve 72 at its lower end and a cam follower 73 at its upper end. Disposed within the sleeve 72 and arranged in end-to-end relation to each other are two eccentric sleeves 74 which extend outwardly beyond the opposite sides of the crosshead 70 and the sleeve 72, with their projecting ends slidably engaging in guide slots 75 formed in the opposed side walls of the housing 42. Received in the respective eccentric sleeves 74 and laterally extended therefrom on opposite sides of the housing 42 is an arm 38' which forms the lower or base portion of the respective pusher arms 38.

Threadedly mounted in each eccentric sleeve 74 is a set screw 76, these set screws serving to adjustably secure the base arms 38' of the respective pusher arms 38 in any selected position of eccentric adjustment in a generally vertical direction. Threadedly adjustable on each set screw is a knurled nut 77 having one end of a tension spring 78 attached thereto, the opposite end of said spring being suitably anchored to the cross-head 70. By adjusting the nuts 77 either upwardly or downwardly on the set screws 76, a fine adjustment of the pressure of the pusher arms 38 against the sheets in the sheet supply magazines may be quickly effected.

As will be seen from Fig. 15, the sleeve 72 is slotted at 79 to allow the set screws 76 to move angularly relative to the axis thereof, along with the eccentric sleeves 74 in which the base 38' of the respective pusher arms 38 is firmly secured when the set screws are tightened down firmly against the base 38'.

Each cam follower 73 is of generally U-shaped cross-section to define a channel which is open at one side and in which is received a roller 80 which is rotatably mounted on the free end of a pivotal arm 81, said arm 81 being suitably mounted within the housing 42 so as to freely swing about the pivot 82. Also, rotatably carried by an intermediate portion of the pivotal arm 81 is a cam roller 83 which coacts with the cam segment 66 on the cam sprocket 64.

In the operation of the sheet dispenser driving mechanism, it will be understood that the operation is identical for each individual dispenser unit, and reference need be made only to one unit. Each cam sprocket 64 is driven by the drive chain 61 which transmits power thereto from the sprocket 57 on line shaft 11, and as the cam sprocket 64 rotates in a counter-clockwise direction as viewed in Figs. 11, 13 and 14, reciprocating motion is imparted in an upward and downward direction to the rods 68 by means of the connecting rods or links 67 which pivotally connect the push rods 68 to the respective cam sprockets 64. This upward and downward motion of the push rods 68 results in corresponding upward and downward motion of the cross-heads 70 which support the respective pusher arms 38, thereby causing corresponding upward and downward reciprocating motion of the pusher arms. As each connecting rod or link 67 reaches the top of its upward stroke, the cam segment 66 on the cam sprocket 64 comes into contact with the roller 83, and as the cam segment 66 continues to rotate, the cam follower 73 is caused to pivot in a counter-clockwise direction, which in turn imparts a corresponding pivotal movement to the pusher arms 38 and raises the pusher arms out of contact with the paper stacks in the respective sheet magazines E. The pusher arms 38 are held out of contact with the sheets for the remainder of the downward stroke of the pusher arms 38 and push rods 68, until at the bottom of the stroke, the cam segment 66 passes beyond the roller 83, and the cam follower restores the pusher arms 38 to a position of engagement with the top sheet of each stack in the sheet dispensers at the commencement of the upward stroke of the pusher rods 68 and pusher arms 38. During upward movement of the pusher arms 38, which are each preferably provided with a resilient head or knob 84 on the free extremity of the same, the top-most sheet of each stack in the respective paper dispensers is displaced from the stack in an upward direction until the upper edge of the sheet engages a sheet guide plate 85, said guide plate serving to direct the sheet between a pair of feed rolls 86 at the rear edge of each auxiliary conveyor F. At least one of the feed rolls 86 of each pair is positively driven by the sprocket 65 over which the drive chain 61 passes.

Extending forwardly from the feed rolls 86 at the back of each auxiliary conveyor F is a plurality of endless tapes or belts 87 which are driven by the shaft 88 on which the drive sprocket 65 is fixed. Undue slack in the tapes 87 may be taken up in any suitable manner, as by means of slack adjuster rolls 89.

Due to the lateral spacing of the tapes 87 of each auxiliary conveyor F, one face of each sheet may be readily observed by the operator of the machine as each sheet is dispensed from the sheet dispensers, while the opposite face of each sheet will be presented for observation of the operator as the sheet passes between the feed rolls 86 and is fed forwardly by the endless tapes 87. By virtue of this arrangement, the operator of the machine can quickly detect any faulty or blank sheets before they are assembled on the main conveyor table C. When such faulty or blank sheets are detected, the operator can quickly stop the machine for purposes of replacing the defective sheet or sheets as they are fed by the auxiliary feed conveyors F, or as they are deposited on the sheet supports B of the main assembly conveyor A.

It will be understood from the foregoing that due to the double-tiered arrangement of the auxiliary sheet feeding conveyors F, the sheets fed from the rearmost dispenser units will pass from the upper rear conveyor F, then onto the lower forward conveyor F which delivers the sheets successively to the main conveyor at each feed station along the main assembly table C. The sheet dispensers are so timed in relation to each other that the successive sheets from the rear dispenser units will feed successively behind the sheets dispensed by the forward dispenser units, for delivery of two successive sheets at each feeding station while each sheet support B of the main conveyor A remains stationary at the successive feeding stations along the assembly table C.

Starting at the extreme left-hand end of the machine, as viewed in Fig. 1, two sheets will be fed to the first sheet support B on the main conveyor A while the main conveyor remains idle, after which, the main conveyor is advanced until this particular sheet support reaches the next feeding station and stops to receive two more sheets from the next two sheet dispensers at the latter station. The main conveyor is intermittently advanced from station-to-station until a complete set of sheets is fully assembled on the first mentioned sheet support of the main conveyor, and thereafter, the following sheet supports will follow in regular successive turn to advance successively completed sets of sheets towards the delivery or discharge end of the main assembly table C.

The spacing of the guide rails 29 along the opposite edges of the assembly table C may be suitably varied to accommodate sheets of different lengths. Such variation can be produced by pivotally connecting each rail 29 to a series of links 90 at spaced intervals along the assembly table, the opposite ends of said links 90 being pivotally connected to one end of a corresponding set of links 91. The latter links 91 are in turn pivotally connected to the frame of the machine. By the use of screws or bolts 92 at the points of pivotal connection of the respective links 90 and 91 to the frame of the machine and to the guide rails, the guide rails can be quickly adjusted to any desired position by loosening said bolts or screws 92, and then on retightening the same, the guide rails 29 will be held in any desired position of spaced adjustment.

*Jogger mechanism*

Upon completion of the assembly of the sheets on the main conveyor A, which occurs at the last feeding station along the main conveyor, the assembled sheets are carried to an initial jogging station H where the forward edges of the sheets on each successive support or flight B are engaged with a pair of stop pins or other abutments 93 which are mounted for vertical shifting movements and normally project upwardly above the surface of the assembly table C. Also at this initial jogging station, the assembly table C is provided with a pair of spaced jogging rails 94 which generally correspond to the guide rails 29, but which are separate from the latter and are connected to separate vibratable frames 95 at opposite sides of the machine. The jogging rails 94 are generally aligned with the guide rails 29, but are freely shiftable to a limited extent in a transverse direction on the upper surface of the assembly table C, responsive to transverse vibration or reciprocation of the frames 95 which is imparted to the jogging rails 94 by means of links 96 which generally correspond with the links 90 and 91, and which are adjustable in a manner similar to that described in reference to links 90 and 91 for the purpose of permitting variation of the lateral or transverse spacing of the jogging rails.

As will be best seen from reference to Figs. 5, 7a and 16, the lower end of each of the frames 95 on the respective opposite sides of the machine are mounted on rubber or other resilient cushions which preferably have the form of grommets, as indicated at 97, through which the frames 95 are bolted down by bolts 98 to supporting brackets 99 carried by the main frame of the machine. Thus, the frames 95 are each free to rock transversely on the resilient cushions or grommets 97.

Rotatably mounted in the main frame of the machine and extending longitudinally between the frames 95 is a shaft 100 on the opposite ends of which are mounted a pair of eccentrics designated 101 and 102. The eccentrics 101 at the respective opposite ends of the shaft 100 are each provided with connecting rods 103 which extend from said eccentrics 101 to one of the frames 95 to which the free ends of the connecting rods 103 are pivotally connected at 104. In the same manner, additional connecting rods 105 extend from the eccentrics 102 at the corresponding opposite ends of the shaft 100, with the free ends of the connecting rods 105 pivotally connected to the other frame 95 as at 106. The eccentrics 101 and 102 are preferably timed so as to be approximately 180° out of phase with each other so that the vibrations transmitted to the respective frames 95 and the jogging rails 94 will cause the jogging rails to move rapidly towards and away from each other responsive to rotation of the shaft 100. Power is transmitted to the shaft 100 in any suitable manner, as by providing the shaft with a pulley 107 fixed to an intermediate portion of the shaft. Extending about the pulley 107 is an endless belt 108 which is adapted to be driven by a driving pulley 109 fixed on the end of the motor shaft 2 at the side of the motor 1 opposite to the pulley 3. Slack in the belt 108 is taken up by a plurality of spring-biased idlers 110 about which the belt 108 passes, as best shown in Fig. 7a.

In order to permit some variation in the driving speed of the shaft 100, as well as the shaft 6 of the speed reducer unit 7, as permitted by the adjustable pulley 3 and by the multiple sheave pulley 107, the motor 1 is preferably mounted on the frame of the machine so as to be adjustable in an upward and downward direction, as more particularly illustrated in Fig. 7a. Vertical adjustment of the motor 1 is accomplished by a vertically extended screw 111 which is threadedly engaged with the motor supporting bracket 112, said screw 111 being operable by a crank-operated screw 113 which extends to the front of the machine and the free end of which may be engaged by the crank 49 or any other equivalent operating member, the screw 113 being operatively connected to the screw 111 by bevelled gears 114.

As the stacked sheets on the successive sheet supports or flights B of the main conveyor A are moved to the initial jogging station, with the forward edge of the stacked sheets engaged with the stop pins or abutments 93 which project upwardly from the upper face of the assembly table C so as to be confined between the pins 93 and the wall 30 of the respective flights B, the sheets are subjected to a rapid transverse vibration or jogging action which will cause the sheets to assume positions of marginal alignment on all sides of each stack. In order to advance the jogged sheets beyond the initial jogging station, the stop pins 93 must be retracted below the surface of the assembly table C, after which, the main conveyor A is advanced another step to bring the initially jogged sheets to a second jogging station at which there is provided a second pair of stop pins 115 which are identical with the pins 93. The stop pins 115 also normally project upwardly above the upper surface of the assembly table C and are retractable below the surface of the assembly table in the same manner as the pins 93, and simultaneously with the latter. The operating mechanism for projecting and retracting the stop pins 93 and 115 will now be described.

One of the stop pins 93 is carried by an arm 116 which is fixed to a rock shaft 117. Also fixed to the rock shaft 117 at its opposite end is a corresponding arm 118 which carries one of the corresponding stop pins 115. Accordingly, upon rocking of the rock shaft 117 in one direction, one of the pins 93 and one of the pins 115 will be simultaneously retracted below the upper surface of the assembly table C, while rocking of this shaft in the opposite direction will project these pins upwardly above the assembly table and into the path of the successively advancing stacked sheets on the main conveyor A.

The other stop pin 93 is carried by an arm 119 which is fixed to a sleeve 120, said sleeve being suitably connected, as by a connecting bar 121, to another sleeve 122 having another arm 123 extended therefrom and carried thereby, said latter arm 123 carrying the other stop pin 115. The sleeves 120 and 122 are freely rockable on the rock shaft 117, and rocking motion is imparted to said rock shaft 117 by means of a crank arm 124 fixed at one end to rock shaft 117 and pivotally connected at its opposite end to an actuator rod 125, said actuator rod 125 extending downwardly to a bell crank lever 126, to one end of which the lower end of the actuator rod 125 is pivotally connected at 127. The bell crank lever 126 is pivotally mounted for rocking movements about the axis of a shaft 128, and the opposite end of the bell crank lever is provided with a cam follower 129 which engages a cam 130 fixed on the rotatable cam shaft 15.

Also pivotally connected at 127 to one end of the bell crank lever 126 is another actuator rod 131, the upper end of which is pivotally connected to the free end of a crank arm 132, said latter crank arm being carried by the connecting bar 121 which interconnects the sleeves 120 and 122.

By virtue of the foregoing construction, it will be obvious that upon rotation of the cam 130, both actuator rods 125 and 131 will be simultaneously operated to intermittently retract all of the stop pins 93 and 115 at the same time and in timed relation to the main conveyor A, preliminary to each intermittent advancing motion of the main conveyor, and thereafter, all of the stop pins will be simultaneously projected above the upper surface of the main assembly table and into the path of the succeeding stacked sheets on the main conveyor.

*Wire stitcher or stapling mechanism*

Also disposed at the second jogging station and adjacent to the stop pins 115 is a stitcher or stapling mechanism which may be of any suitable type. In the illustrative embodiment of this mechanism, as best shown in Figs. 6 and 9a, at least two separate stitchers or staplers are provided, as generally indicated at 133, each stitcher being a complete unit in itself, and the stitchers being transversely spaced apart so as to stitch or staple the assembled sheets at spaced points along the forward edge of each successive stack on the main conveyor A, while the assembled sheets are engaged with the stop pins 115. The specific type of stitchers or staplers illustrated at 133 are conventional and well known, and are identified in the trade as "Champion Wire Stitchers." Such stitchers are customarily provided with a wire supply spool (not shown) from which the wire 134 is drawn off, cut to the required length, according to the staple size desired, formed into the shape of a staple, and then the successively formed staples are driven through the stacked sheets responsive to downward movement of the staplers 133. As the staples are driven through the assembled sheets, cooperating anvils 135 associated with each stapler 133 engage the projecting ends of the staples at the bottom side of the stacked sheets to clinch the staples. It is to be understood that the details of the stitching or stapler mechanism are not material to the present invention, and that any other appropriate form of stitching or stapler mechanism may be substituted for those shown in the drawings. However, the present invention includes novel or improved instrumentalities for adjustably supporting and operating the staplers 133, as will now be more particularly described.

Referring to Figs. 6, 7, 16 and 17, the stitchers 133 are suitably mounted on slotted bars 136, each bar being preferably provided with transversely extended slots 137 to permit selective adjustment of the transverse spacing of the stitchers. On the opposite ends of one of the bars 136, toothed racks 138 are provided, which racks mesh with pinions 139 on a transverse shaft 140. From the bottom of each rack 138, there is extended a rod 141, said rods being threaded at their lower ends and passed through a transversely extended bar 142 which is adjustably clamped between clamping nuts 143 threadedly received on the lower end of each rod 141. Rigidly mounted on the bar 142, and extending downwardly therefrom is a pair of transversely spaced bars 144 between which there is rigidly mounted a pair of vertically spaced bars 145 between which is extended a crank pin 146 extending from a crank 147, said crank being fixed on the end of the rotatable cam shaft 15. Thus, rotation of the cam shaft 15 will impart vertical reciprocating motion to the stitchers or staplers 133 in an upward and downward direction and in timed relation to the main conveyor A and other parts of the machine.

Also fixed on the cam shaft 15 is a cam 148 which cooperates with a cam follower 149 carried by one end of a bell crank lever 150 rockably mounted on shaft 128. The opposite end of the bell crank lever 150 is pivotally connected to the lower end of an actuator rod or link 151, and the upper end of the rod 151 is pivotally connected to an arm 152 fixed to one end of a transverse rock shaft 153, said rock shaft being provided with a longitudinally extended groove 154 in which is received the lower end of an actuator bar 155 extended downwardly from each anvil 135, said actuator bars 155 being reciprocable in an upward and downward direction responsive to rocking motion of the shaft 153 to actuate the clincher blocks 156 which are conventional parts of the illustrated stitcher or stapling mechanism. As will be best seen from reference to Figs. 6 and 9a, the anvil assemblies 135 are mounted in transversely spaced relation to each other on a slotted transverse bar or frame member 157, said bar being provided with transversely extended slots 158 to permit adjustment of the transverse spacing of the anvils 135 according to the spacing of the stitchers 133 which are likewise adjustably mounted on the slotted transverse bars 136, as previously described.

Since my collating machine is adapted to handle sheets of different size, and since the sheets being collated may be of different widths on different runs through the machine, provision is preferably made for longitudinal adjustment of the stitching or stapling mechanism to compensate for such differences in the widths of the sheets for different runs, as well as to permit variation of the spacing of the staples in relation to the extreme marginal edges of the assembled sheets at the stitched side thereof. Accordingly, the stapler supporting bars 136 are preferably mounted in a unitary frame assembly generally designated 159 as best shown in Fig. 17, the lower end of said frame assembly including transversely spaced, longitudinally extended frame bars 160 which are slidably supported on supporting rails 161 at the front and back, respectively, of the frame of the machine. The lower faces of the supporting bars 160 are provided with racks 162 which coact with pinions 163 fixed on a transverse shaft 164 transversely extended between the supporting rails 161 and rotatably mounted therein. The forward end of the shaft 164 is provided with a suitable crank-operated head 165 which projects to the front of the machine so as to be conveniently engageable and operated by the crank 49 or any other suitable operating instrumentality. By rotating the shaft 164 in either direction, the entire frame assembly 159, together with the stitcher or stapler units, may be shifted longitudinally in one direction or the other, as will be obvious.

Provision is also preferably made for locking the frame assembly 159 in its selected positions of longitudinal adjustment, said locking means being illustrated as a screw shaft 166 which extends transversely between the supporting rails 161, one end of said screw shaft being threaded through one of the rails 161, and the opposite end of the shaft extending through the opposite rail 161 and terminating in a crank-operated head 167 corresponding to the head 165 on shaft 164. The head 167 may be operated by the crank 49 or any other comparable operating device. Fixed to the lower face of one of the frame bars 160 is a longitudinally slotted clamping bar 168, said clamping bar having a slot 169 extended longitudinally thereof and through which the screw shaft 166 freely extends for threaded engagement with the adjacent supporting rail 161, as indicated at 170. Upon rotation of the screw shaft 166 in one direction, the supporting rail 161 with which the screw shaft is threadedly engaged will be slightly sprung or flexed toward the opposite supporting rail 161, thereby causing the flexed rail 161 to firmly bear against the clamping bar 168 which is fixed to the lower face of the adjacent frame bar 160. Accordingly, this clamping pressure against the bar 168 produces a locking action in the nature of a friction lock which is sufficient to hold the frame assembly 159 in any selected position of longitudinal adjustment. To permit longitudinal adjustment of the frame assembly 159 at any time, it is only necessary to turn the screw shaft 166 in the opposite direction to thereby release the clamping pressure of the rail 161 against the clamping bar 168.

*Stacking receiver*

Upon completion of the final jogging operation, and after stitching or stapling the assembled sheets into a finished booklet or pamphlet form at the latter station, the assembled sheets are then advanced to the discharge or delivery end of the main conveyor A, where the assembled sheets are successively delivered by the main conveyor to a stacking receiver M. The details of the stacking receiver are best shown in Figs. 7, 8, 9, 9a, 10 and 16. Said stacking receiver includes two vertically extended side walls 171 which extend from the upper level of the main conveyor table C, downwardly to a point near the floor on which the bottom of the machine is supported. The forward edges of the side walls 171 are extended inwardly as at 172 to hold the pamphlets or booklets K within the stacking receiver as they are discharged or delivered to the same. The extended walls 172 terminate in transversely spaced relation to each other to permit free access to the receiver for the purpose of removing the stacked booklets or pamphlets from the stacking receiver M.

Extending downwardly in the receiver and rigidly supported in a vertical position is a pair of transversely spaced guide rods 173 on which is slidably mounted the receiving tray or platform N which is provided at its rear edge with a pair of guide sleeves 174 slidably fitted on the guide rods 173.

Anchored to the rear edge of the tray or platform N is one end of a chain 175, said chain passing over a sprocket 176 which is fixed on a transverse shaft 177. From the sprocket 176, the chain 175 passes around a freely suspended idler roll 178 which is rotatably mounted in a bracket 179 to which one end of a tension spring 180 is anchored as at 181. The opposite end of the coiled tension spring 180 is anchored to the bottom of the frame of the machine, as at 182. From the idler roll 178, the chain passes upwardly to a point about on a level with the axis of the shaft 177, where the end of the chain is suitably anchored to any convenient part of the frame of the machine, as indicated at 182'. By virtue of this arrangement, the tension of the coil spring 180 normally tends to urge the platform or tray N of the stacking receiver M in an upward direction on the guide rods 173.

Rotatably mounted on shaft 21 is a gear 183 which is engaged by a spring-biased pawl 184, said pawl being pivotally mounted on a quadrant bar 185 which is freely rockable on said shaft 21, the end of said quadrant bar opposite to the end which carries the pawl 184 being transversely extended as at 186 for engagement with the notched end 187 of an arm 188 forming a part of the rockable beam 20, the rocking movements of which impart motion to the quadrant bar 185 to intermittently drive the gear 183 through the pawl 184. A spring-biased holding dog 189 also engages the gear 183 to prevent the gear from rotating in the opposite direction from that imparted by the pawl 184.

The gear 183 meshes with another gear 190 fixed on the end of transverse shaft 177. Pivotally mounted on shaft 21 adjacent to the gear 183 is a shield 191 having a crank-operated head 191' fixed thereto and extended laterally therefrom about shaft 21 on which the head is freely rotatable. Rockably mounted on shaft 177 is a link 192, said link being transversely extended at 193 in parallel relation to the shaft 177, and terminating in an arm 194 which also pivots on shaft 177. The free end of said arm 194 is pivotally connected to the lower end of a pile height detector 195 which is operable by engagement with the assembled sheets or booklets as they are discharged or delivered to the stacking receiver and are stacked on the platform N thereof.

Pivotally connected to the free end of link 192, as by means of a short connecting link 196, is a cam lever 197 rockably mounted on shaft 21, the upper end of said cam lever 197 being provided with a camming surface 198 which is shiftable into and out of engagement with a pin 199 extended laterally from the pawl 184, responsive to rocking movements of the cam lever 197.

With the parts of the operating mechanism in the condition illustrated in Fig. 9 of the drawings, it will be seen that the pile height detector 195 projects forwardly into the path of the assembled booklets or pamphlets as they are discharged into the stacking receiver M and are deposited onto the movable platform or tray N. At such time, the pawl 184 is held out of engagement with the gear 183 due to engagement of the cam surface 198 with the pin 199 of the pawl, thereby elevating the pawl and interrupting the transmission of power to the gear 183 which would otherwise be imparted thereto by the rocking action of the quadrant bar 185. At this time, the holding dog 189 holds the gear 183 stationary and prevents it from rotating as the result of the tension of coil spring 180 which is imposed on chain 175. However, as the assembled sheets are stacked on the platform or tray N to a height sufficient to cause the stacked sheets to press against the pile height detector 195, said detector 195 will be pushed inwardly and simultaneously raised upwardly pursuant to the pressure of a pin 200 which is extended transversely through the pile height detector 195 and bears against the upper curved surfaces 201 of a camming bracket 202 in which the pile height detector 195 is freely slidable in an upward and downward direction. Thus, as the pile detector 195 is depressed and simultaneously raised upwardly, it will actuate the mechanism just described to cause the various parts thereof to assume the positions illustrated in Fig. 10, wherein the pawl 184 is released by the cam lever 197, allowing the pawl 184 to engage the gear 183 so as to intermittently drive the gear 183 in a counter-clockwise direction. This driving operation continues, with a corresponding driving of the sprocket 176 over which the chain 175 passes, thereby causing slack in the chain to be taken up, and resulting in downward movement of the platform or tray N in the stacking receiver M, until the top of the stacked sheets on the tray or platform N is lowered sufficiently to disengage the sheets from the pile height detector 195, at which time the mechanism will be actuated to resume the condition represented in Fig. 9, with a consequent interruption of any further lowering movement of the platform or tray N until the pile height of the sheets is further increased.

It will thus be understood from the foregoing that the downward movement of the platform or tray N will occur intermittently as the sheets are stacked on the platform, until ultimately, the platform reaches the limit of its travel in a downward direction, which occurs when the stacking receiver has been completely filled. At such time, the platform N will operate a stop switch 203 which is preferably provided to automatically stop the machine until the stacking receiver has been unloaded. After removing the stacked sheets from the stacking receiver, the platform N may be restored to its upper limit of vertical motion toward the top of the stacking receiver M, as by applying the crank 49 onto the head 191' of shield 191 and rotating the shield clockwise until the cam face 191'' on the shield engages the pin 199 of pawl 184 and raises the latter out of engagement with gear 183. Further rotation of shield 191 causes the peripheral edge of shield 191 to ride under pin 199 and continue to hold pawl 184 elevated, while cam face 191'' moves to engage pin 189' on holding dog 189 and elevates the dog in a similar manner to disengage it from gear 183, whereupon the tension of spring 180 will pull platform N upwardly to the top of the receiver M. When the platform or receiving tray N has been restored by the tension of spring 180 to the top of the stacking receiver, the stop switch 203 is automatically released and operation of the collating machine may be resumed by operating either of the control switches O.

*General operation*

Briefly summarizing the general operation of my new collating machine, it is to be understood that before starting the machine, the sheets to be collated must be first loaded in a stacked condition in the respective sheet supply magazine of the dispensers E. To facilitate loading of the sheet magazines, the magazines can be adjusted to the extreme limit of their rearwardly tilted positions, as shown in Fig. 12, as by applying the crank 49 to each main adjusting screw 52 and then rotating the screw in the appropriate direction to cause simultaneous tilting of all or a substantial group of the magazines. After loading the magazines, they can be restored to their normal generally upright positions, as indicated in Figs. 3 and 11, as by rotating the screw 52 in the opposite direction. Individual adjustment of the position of the respective magazines E can also be made, if necessary, by applying the crank 49 to any of the individual adjusting screws 46, in order to attain the desired pressure of the individual pusher arms 38 against the stacked sheets in the respective magazines. A still further and finer adjustment of this pressure can be attained by regulating the tension of the coil springs 78 which are connected to adjustable nuts 77 on the set screws 76, these springs acting independently on the inof the set screws in the slots 79 that are provided in the sleeves 72.

After the magazines E have been loaded and everything is in readiness to start a sheet collating run, the machine is put into operation by actuating one of the control switches O at the front of the machine. Thereupon, the sheets will be fed from the sheet supply magazines E at each feeding station along the main assembly table C, and the sheets will be deposited on the sheet supports or flights B as each support stops momentarily at each feeding station. According to the arrangement illustrated in the drawings, two sheets will be fed in successive order from the two dispensers at each feeding station, and as the sheets are successively pushed upwardly by the pusher arms 38 which reciprocate in a generally upward and downward direction, the sheets will be directed by auxiliary conveyors F onto the main conveyor A, after which, the main conveyor is intermittently advanced step-by-step past each feeding station, until finally all of the sheets are assembled in a stacked condition at the last feeding station.

From the last feeding station, the stacked sheets are successively moved to an initial jogging station, at which station the forward edges of the stacked sheets are brought into engagement with the stop pins or abutments 93. As the main conveyor A pauses at this initial jogging station, the stacked sheets are subjected to a rapid transverse vibration as produced by the jogging rails 94 which are rapidly reciprocated towards and away from each other, causing the stacked sheets to quickly align themselves in a neatly piled condition, with the marginal edges of the sheets uniformly even with each other. From the initial jogging station, the stacked sheets on the main conveyor are advanced to a second jogging station where another jogging operation is performed thereon while the main conveyor pauses, and while the sheets are engaged with the stop pins 115. The jogging rails 94 are made of sufficient length to perform a jogging action at the initial jogging station, as well as at the final jogging station, both at the same time, these jogging rails 94 being separate from the main guide rails 29 with which the jogging rails are generally aligned.

At the final jogging station, the stacked sheets are suitably secured together by the stitcher or stapler mechanism generally designated J, the latter mechanism being operated in timed relation to the main conveyor A, and the stitching or stapling action being performed while the main conveyor pauses at this station. If no stitching or stapling of the assembled sheets is desired or required, the stitcher mechanism may be rendered inoperative by suitably disconnecting any convenient part of the drive mechanism which drives the stapling units 133 in a generally upward and downward direction in performing the stapling action.

Preliminary to the advancement of the main conveyor A beyond the final jogging and stitching station, the stop pins 115, as well as those designated 93, are retracted below the upper surface of the assembly table C, after which, the main conveyor is intermittently advanced to deliver the finally assembled sheets at the discharge end of the machine, where the assembled sheets are preferably discharged in assembled groups, one on top of another, upon a platform or receiving tray N located in the receiver M and movable downwardly in the receiver as the assembled sheets are piled on the platform. Movement of the platform N is controlled by the pile height detector 195, and as long as the pile is of sufficient height to depress the detector 195, the platform N will slowly move in a downward direction until it reaches the lower limit of its downward travel in the receiver M, at which time, the receiver will be filled to the limit of its capacity. At that time, the platform comes into engagement with the stop switch 203 which automatically operates to stop the entire collating machine.

Thereupon, the receiver M may be quickly unloaded, during which the stacked sheets can be handled in stacks of convenient size. After unloading the receiver M, the platform N must then be restored to its elevated position at the top of the receiver, which releases the stop switch 203 and permits the machine to be re-started by operation of one of the control switches O to resume further collating operations.

Whenever the number of sheets to be collated is such as to require use of less than all of the sheet dispensers with which the machine is equipped, any desired group or groups of dispensers may be put out of operation as by disengaging one or more of the couplings 59 on the line shaft 11 so as to interrupt the drive from the line shaft to the cooperating sleeve coupling 56.

While the specific details of the construction have been herein shown and described, it is to be understood that my invention is not confined thereto as changes and alterations may be made without departing from the spirit of the invention, as defined by the appended claims.

I claim:

1. A sheet collating machine, comprising a sheet assembly table extended longitudinally from end-to-end of the machine, a main sheet conveyor mounted on said table to receive sheets at a plurality of feeding stations along said table for the progressive forming of groups of sheets on said conveyor, said main conveyor including a plurality of sheet supports spaced apart equidistantly from each other along the conveyor and connected to an endless conveyor chain for moving the supports along the upper face of said assembly table from one end to the other and for returning the sheet supports beneath the assembly table, means for intermittently driving said conveyor chain and the sheet supports connected thereto, said driving means being timed to interrupt motion of the sheet supports as they successively advance past each feeding station, sheet feeding means disposed at one side of the main conveyor at each feeding station, each sheet feeding means including a dispenser having a supply magazine for holding a supply of stacked sheets, means for separately and successively feeding said sheets upwardly from each magazine with one face of each successive sheet exposed to view from the opposite side of said conveyor, an auxiliary endless belt conveyor disposed above each dispenser for receiving the successive sheets from its supply magazine with the other face of each successive sheet exposed to view from said opposite side of the conveyor and for delivering the sheets from the supply magazine to the successive sheet supports on the main conveyor aforesaid, and means for driving the feeding means for the dispensers and for driving the auxiliary conveyors in timed relation to each other and to the main conveyor.

2. Apparatus as defined in claim 1, wherein the sheet feeding means are driven by a common line shaft having means for coupling the feeding means thereto and for uncoupling the same therefrom, individually, at will.

3. Apparatus as defined in claim 1, wherein the sheet supply magazine of each dispenser is normally supported in a generally upright position, with the stacked sheets resting on their lower marginal edges, and the sheet feeding means for each magazine includes a generally vertically reciprocable pusher arm frictionally engageable with the successive stacked sheets for feeding the same upwardly to the auxiliary sheet feeding conveyors upon upward movements of said arm, and means for disengaging said arm from succeeding stacked sheets during downward movements of said arm.

4. Apparatus as defined in claim 1, wherein the sheet supply magazine of each dispenser is normally supported in a generally upright position and includes an adjustably mounted sheet-supporting shelf, with the stacked sheets resting on their lower marginal edges on said shelf, said supply magazines being pivotally mounted for adjustable tilting movements toward and away from their upright position.

5. Apparatus as defined in claim 1, wherein the sheet supply magazine of each dispenser is normally supported in a generally upright position, with the stacked sheets resting on their lower marginal edges, said supply magazines being pivotally mounted for adjustable tilting movements toward and away from their upright position, and having adjusting means connected therewith and extending to the other side of said main conveyor for selectively adjusting the same.

6. Apparatus as defined in claim 1, wherein the sheet supply magazine of each dispenser is normally supported in a generally upright position, with the stacked sheets resting on their lower marginal edges, said supply magazines being pivotally mounted for adjustable tilting movements toward and away from their upright position, and having adjusting means connected therewith and extending to the other side of said main conveyor for selectively adjusting the same individually.

7. Apparatus as defined in claim 1, wherein the sheet supply magazine of each dispenser is normally supported in a generally upright position, with the stacked sheets resting on their lower marginal edges, said supply magazines being pivotally mounted for adjustable tilting movements toward and away from their upright position, and having means for selectively adjusting the same individually and collectively.

8. Apparatus as defined in claim 1, wherein the sheet feeding means are arranged in groups, the feeding means of each group having common operating means for operating the same from a line shaft.

9. Apparatus as defined in claim 1, wherein the sheet feeding means are arranged in double-tiered groups, the feeding means of each double-tiered group having common operating means for operating the same from a line shaft.

10. A sheet collating machine, comprising an endless conveyor, a plurality of similar sheet feeding units spaced longitudinally at separate sheet feeding stations along the conveyor for progressively assembling groups of sheets in stacked relation on the conveyor, means for aligning the marginal edges of the stacked sheets including means at a predetermined point along the conveyor for confining the advancing and trailing edges of the stacked groups of sheets therebetween, and means for transversely jogging the stacked groups of sheets while confined by the confining means aforesaid.

11. A sheet collating machine, comprising an endless conveyor, a plurality of similar sheet feeding units spaced longitudinally at separate sheet feeding stations along the conveyor for progressively assembling groups of sheets in stacked relation on the conveyor, and means for jogging the stacked groups of sheets at a predetermined point along the conveyor to align the marginal edges of the stacked sheets, said jogging means including shiftable stop means projectable into and retractable out of the path of movement of the successive stacks of sheets and successively engageable with the forward marginal edges of the stacked sheets as they are advanced to the jogging means by the conveyor, and reciprocating means acting on the marginal edges of the stacked sheets in a direction transverse to the path of advancement of the sheets along the conveyor and while the sheets are in engagement with the stop means aforesaid, said reciprocating means comprising a pair of supports respectively disposed on the opposite sides of said conveyor, a pair of jogging rails longitudinally extended in parallel relation to said conveyor and respectively carried by said supports, resilient means rockably mounting said supports for movements of said rails towards and away from the conveyor into and out of engagement with the opposed margins of said stacked sheets, and means for rapidly rocking said supports on their resilient mountings.

12. A sheet collating machine, comprising an endless conveyor, a plurality of similar sheet feeding units spaced longitudinally at separate sheet feeding stations along the conveyor for progressively assembling groups of sheets in stacked relation on the conveyor, means for jogging the stacked groups of sheets at a predetermined point along the conveyor to align the marginal edges of the stacked sheets, said jogging means comprising a pair of rails longitudinally extended at opposite sides of the conveyor, upstanding rail supports on which said rails are mounted, said rail supports having their bases resiliently mounted to allow rocking movements of said supports towards and away from the conveyor, and means for rocking said rail supports on their resilient mountings, and means for stitching the successively jogged groups of stacked sheets together.

13. A sheet collating machine, comprising an endless conveyor, a plurality of similar sheet feeding units spaced longitudinally at separate sheet feeding stations along the conveyor for progressively assembling groups of sheets in stacked relation on the conveyor, means for jogging the stacked groups of sheets at a predetermined point along the conveyor to align the marginal edges of the stacked sheets, and means for stitching the successively jogged groups of stacked sheets together, said stitching means comprising a plurality of stapling units arranged in laterally spaced relation to each other adjacent to the discharge end of the conveyor, and means for adjusting the position of the stapling units longitudinally of the conveyor, including an auxiliary frame shiftably mounted on the machine for movements longitudinally thereof and having transverse supports thereon, said stapling units being shiftably mounted on said transverse supports, means for varying the lateral spacing of the stapling units on said transverse supports, and operating means for shifting said auxiliary frame longitudinally of the machine.

14. A sheet collating machine, comprising an endless conveyor, a plurality of similar sheet feeding units spaced longitudinally at separate sheet feeding stations along the conveyor for progressively assembling groups of sheets in stacked relation on the conveyor, means for jogging the stacked groups of sheets at a predetermined point along the conveyor to align the marginal edges of the stacked sheets, and means for stitching the successively jogged groups of stacked sheets together, said stitching means comprising a plurality of stapling units arranged in laterally spaced relation to each other adjacent to the discharge end of the conveyor, means for adjusting the position of the stapling units longitudinally of the conveyor including an auxiliary frame on which said stapling units are mounted, a machine having laterally spaced rails on which said auxiliary frame is shiftably mounted for movements longitudinally of the machine, means for shifting said frame longitudinally of the machine, and means for releasably locking the stapling means in any selected position of longitudinal adjustment, said locking means including means for stressing said side rails into engagement with said auxiliary frame to bind the same against movement relative to said rails.

References Cited in the file of this patent

UNITED STATES PATENTS

| Number | Name | Date |
|---|---|---|
| 420,194 | Gauchot | Jan. 28, 1890 |
| 787,838 | Dexter | Apr. 18, 1905 |
| 985,264 | Lewis | Feb. 28, 1911 |
| 1,127,034 | Lewis | Feb. 2, 1915 |
| 1,177,600 | Bredenberg | Apr. 4, 1916 |
| 1,385,067 | Barber | July 19, 1921 |
| 1,818,065 | Jones | Aug. 11, 1931 |
| 1,850,108 | Hunter | Mar. 22, 1932 |
| 2,027,177 | Kluge | Jan. 7, 1936 |
| 2,277,846 | Couch | Mar. 31, 1942 |
| 2,393,254 | Leifer | Jan. 22, 1946 |
| 2,542,089 | Leifer | Feb. 20, 1951 |
| 2,649,302 | Johnson | Aug. 18, 1953 |